US009412116B2

(12) United States Patent
Jain

(10) Patent No.: US 9,412,116 B2
(45) Date of Patent: *Aug. 9, 2016

(54) SYSTEMS, METHODS AND MACHINE-READABLE MEDIA FOR FACILITATING PROVISIONING OF PLATFORMS

(71) Applicant: YP LLC, Tucker, GA (US)

(72) Inventor: Mehul Jain, Foster City, CA (US)

(73) Assignee: YP, LLC, Tucker, GA (US)

( * ) Notice: Subject to any disclaimer, the term of this patent is extended or adjusted under 35 U.S.C. 154(b) by 234 days.

This patent is subject to a terminal disclaimer.

(21) Appl. No.: 14/271,347

(22) Filed: May 6, 2014

(65) Prior Publication Data

US 2014/0337527 A1    Nov. 13, 2014

Related U.S. Application Data

(60) Provisional application No. 61/820,552, filed on May 7, 2013, provisional application No. 61/820,554, filed on May 7, 2013, provisional application No. 61/820,559, filed on May 7, 2013, provisional application No. 61/820,565, filed on May 7, 2013.

(51) Int. Cl.
*H04L 29/08* (2006.01)
*G06Q 30/02* (2012.01)
*H04L 29/06* (2006.01)

(52) U.S. Cl.
CPC ............ *G06Q 30/0201* (2013.01); *H04L 67/16* (2013.01); *H04L 67/306* (2013.01); *H04L 67/38* (2013.01)

(58) Field of Classification Search
CPC .. G06Q 30/0201; H04L 67/16; H04L 67/306; H04L 67/38

USPC ......... 709/201, 213, 217–219, 220, 225, 249; 705/7.29

See application file for complete search history.

(56) References Cited

U.S. PATENT DOCUMENTS

| | | | | |
|---|---|---|---|---|
| 8,332,517 B2* | 12/2012 | Russell | ............. | G06Q 30/0631 705/50 |
| 9,247,470 B2* | 1/2016 | Jain | ....................... | H04W 36/14 |
| 2008/0262901 A1* | 10/2008 | Banga | .............. | G06Q 10/06375 705/14.53 |
| 2010/0191846 A1* | 7/2010 | Raleigh | ............ | G06Q 10/06375 709/224 |
| 2014/0189802 A1* | 7/2014 | Montgomery | .......... | H04L 63/08 726/4 |
| 2014/0337093 A1 | 11/2014 | Jain | | |
| 2014/0337094 A1 | 11/2014 | Jain | | |
| 2015/0127628 A1* | 5/2015 | Rathod | ................ | H04W 4/206 707/710 |

* cited by examiner

*Primary Examiner* — Alina N Boutah
(74) *Attorney, Agent, or Firm* — Alston & Bird LLP

(57) ABSTRACT

Systems and method to facilitate provisioning of a plurality of platforms are provided. First information enabling unique identification of a first provider may be processed. The first provider may be matched to a first category. A first set of platform features may be identified. A first set of service modules may be determined. A first definition of a first platform that is configured to interact with the first set of service modules to provide the first set of platform features may be generated. A first plan to provide access to the first platform with the first set of service modules may be generated. A first platform application may be configured to provide the first platform based at least in part on the plan. The configuring may include integrating the first set of service modules into the first platform application using one or more component interfaces.

20 Claims, 15 Drawing Sheets

SYSTEMS, METHODS AND MACHINE-READABLE MEDIA FOR FACILITATING PROVISIONING OF PLATFORMS

CROSS-REFERENCES TO RELATED APPLICATIONS

The present application claims the benefit of the following U.S. Provisional patent applications: U.S. Provisional Patent Application No. 61/820,552, filed May 7, 2013, entitled "ADVISING MANAGEMENT SYSTEM;" U.S. Provisional Patent Application No. 61/820,554, filed May 7, 2013, entitled "GAMING ASSISTANCE SYSTEMS AND METHODS;" U.S. Provisional Patent Application No. 61/820,559, filed May 7, 2013, entitled "ACCREDITED ADVISOR MANAGEMENT SYSTEM;" and U.S. Provisional Patent Application No. 61/820,565, filed May 7, 2013, entitled "PLATFORM SHAPE SHIFTER;" the entire disclosure of each of which is hereby incorporated by reference for all purposes. In addition, the present application is related to the following co-pending and commonly assigned U.S. patent applications: U.S. patent application Ser. No. 14/271,336, entitled "ADVISING MANAGEMENT SYSTEM WITH SENSOR INPUT;" and U.S. patent application Ser. No. 14,271,339, entitled "ACCREDITED ADVISOR MANAGEMENT SYSTEM;" the entire disclosure of each of which is incorporated herein by reference for all purposes.

BACKGROUND OF THE DISCLOSURE

The present disclosure relates in general to service provider systems, and, more specifically, but not by way of limitation, to platform shape shifter systems.

In the current market, service providers are seeking more cost-effective ways to establish and increase presence in the marketplace. For many small businesses, the cost and hassle of entry into the digital marketplace has been prohibitive, daunting, or at least burdensome. As a result, many potential entrants into the digital marketplace have put off entry or have opted for less optimal means that do not serve their needs adequately. However, as value, use, access, and demand corresponding to digital marketing continue to increase, service providers demand more of the products and services they use than ever before. Companies are expected to compete to provide greater and greater levels of accuracy and more tailored service offerings for service providers. There is a need for more tailored service offerings for service providers.

BRIEF SUMMARY

Certain embodiments of the present disclosure relates in general to service provider systems, and, more specifically, but not by way of limitation, to platform shape shifter systems.

In one aspect, a system to facilitate provisioning of a plurality of platforms is provided. The system may include any one or combination of the following. One or more network interfaces may be configured to provide access to a network. One or more processors may be coupled to the one or more network interfaces to enable provisioning of a plurality of platforms. The one or more processors may execute instructions to perform any one or combination of the following. First information enabling unique identification of a first provider may be processed. The first provider may correspond to a provider of one or more services and/or products. The first provider may be matched to a first category from a set of categories. The first provider may match one or more categories of the set of categories. The first category may represent a first classification of a first set of providers sharing a first set of common attributes. A first set of platform features may be identified based at least in part on the first category. The first set of platform features may correspond to features that a platform application is adaptable to provide. A first set of service modules corresponding at least partially to the first set of platform features may be determined. A first definition of a first platform that is configured to interact with the first set of service modules to provide the first set of platform features may be generated. A first plan to provide access to the first platform with the first set of service modules may be generated based at least in part on the definition of the first platform. The definition and the plan may be retained in one or more repositories accessible by the one or more processors. A first platform application may be configured to provide the first platform based at least in part on the plan. The configuring may include integrating the first set of service modules into the first platform application using one or more component interfaces. User access, via the network, to the first platform may be enabled. The user access may be provided for the first provider. One or more storage media may be coupled to the one or more processors to retain the instructions.

In another aspect, a method to facilitate provisioning of a plurality of platforms, the method is provided. The method may include any one or combination of the following, and any one or combination of the following may be performed by a computer system. First information enabling unique identification of a first provider may be processed. The first provider may correspond to a provider of one or more services and/or products. The first provider may be matched to a first category from a set of categories. The first provider may match one or more categories of the set of categories. The first category may represent a first classification of a first set of providers sharing a first set of common attributes. A first set of platform features may be identified based at least in part on the first category. The first set of platform features may correspond to features that a platform application is adaptable to provide. A first set of service modules corresponding at least partially to the first set of platform features may be determined. A first definition of a first platform that is configured to interact with the first set of service modules to provide the first set of platform features may be generated. A first plan to provide access to the first platform with the first set of service modules may be generated based at least in part on the definition of the first platform. The definition and the plan may be retained in one or more repositories accessible by the one or more processors. A first platform application may be configured to provide the first platform based at least in part on the plan. The configuring may include integrating the first set of service modules into the first platform application using one or more component interfaces. User access, via the network, to the first platform may be enabled. The user access may be provided for the first provider.

In yet another aspect, one or more non-transitory, machine-readable media having machine-readable instructions thereon for facilitating provisioning of a plurality of platforms are provided. The instructions, when executed by one or more computers or other processing devices, may cause the one or more computers or other processing devices to perform any one or combination of the following. First information enabling unique identification of a first provider may be processed. The first provider may correspond to a provider of one or more services and/or products. The first provider may be matched to a first category from a set of categories. The first provider may match one or more categories of the set of categories. The first category may represent a first classification of a first set of providers sharing a first set of common attributes. A first set of platform features may be identified based at least in part on the first category. The first set of platform features may correspond to features that a platform application is adaptable to provide. A first set of service modules corresponding at least partially to the first set of platform features may be determined. A first definition of a first platform that is configured to interact with the first set of service modules to provide the first set of platform features may be generated. A first plan to provide access to the first platform with the first set of service modules may be generated based at least in part on the definition of the first platform. The definition and the plan may be retained in one or more repositories accessible by the one or more processors. A first platform application may be configured to provide the first platform based at least in part on the plan. The configuring may include integrating the first set of service modules into the first platform application using one or more component interfaces. User access, via the network, to the first platform may be enabled. The user access may be provided for the first provider.

In various embodiments, information about at least part of the first set of service features with corresponding user-selectable options may be exposed via the network. One or more indications of user selection of one or more service features of the first set of service features may be processed. The one or more indications of user selection may be received via the network. The determining the set of service modules may be based at least in part on the one or more indications of user selection of one or more service features of the set of service features.

In various embodiments, second information enabling unique identification of a second provider may be processed. The second provider may be matched to a second category from the set of categories. A second set of platform features may be identified based at least in part on the second category. A second set of service modules corresponding at least partially to the second set of service features may be determined. A second definition of a second platform that is configured to interact with the second set of service modules may be generated. A plan to provide access to the first platform with the set of service modules may be generated based at least in part on the definition of the first platform. A second platform application may be configured to provide the second platform based at least in part on the second plan. User access, via the network, to the second platform for the second provider may be enabled.

In various embodiments, processing resources and/or database resources may be allocated to the first platform application based at least in part on the plan.

In various embodiments, a first set of content related to the first provider may be processed. The first set of content may relate to aspects of a business. A first subset of content may be prepared from the first set of content for presentation via the first platform application.

In various embodiments, communication between the first provider and a consumer may be facilitated through the network based at least in part on the first platform.

In various embodiments, a first set of platform features may be identified based at least in part on a platform template associated with the first category. A second set of platform features may be identified based at least in part on the first category. The second set of platform features may correspond to one or more potential customizations to the platform application. Information about at least part of the second set of service features may be exposed, via the network, with corresponding user-selectable options. The determining the first set of service modules may be based at least in part on one or more indications of user selection of one or more service features of the second set of service features.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
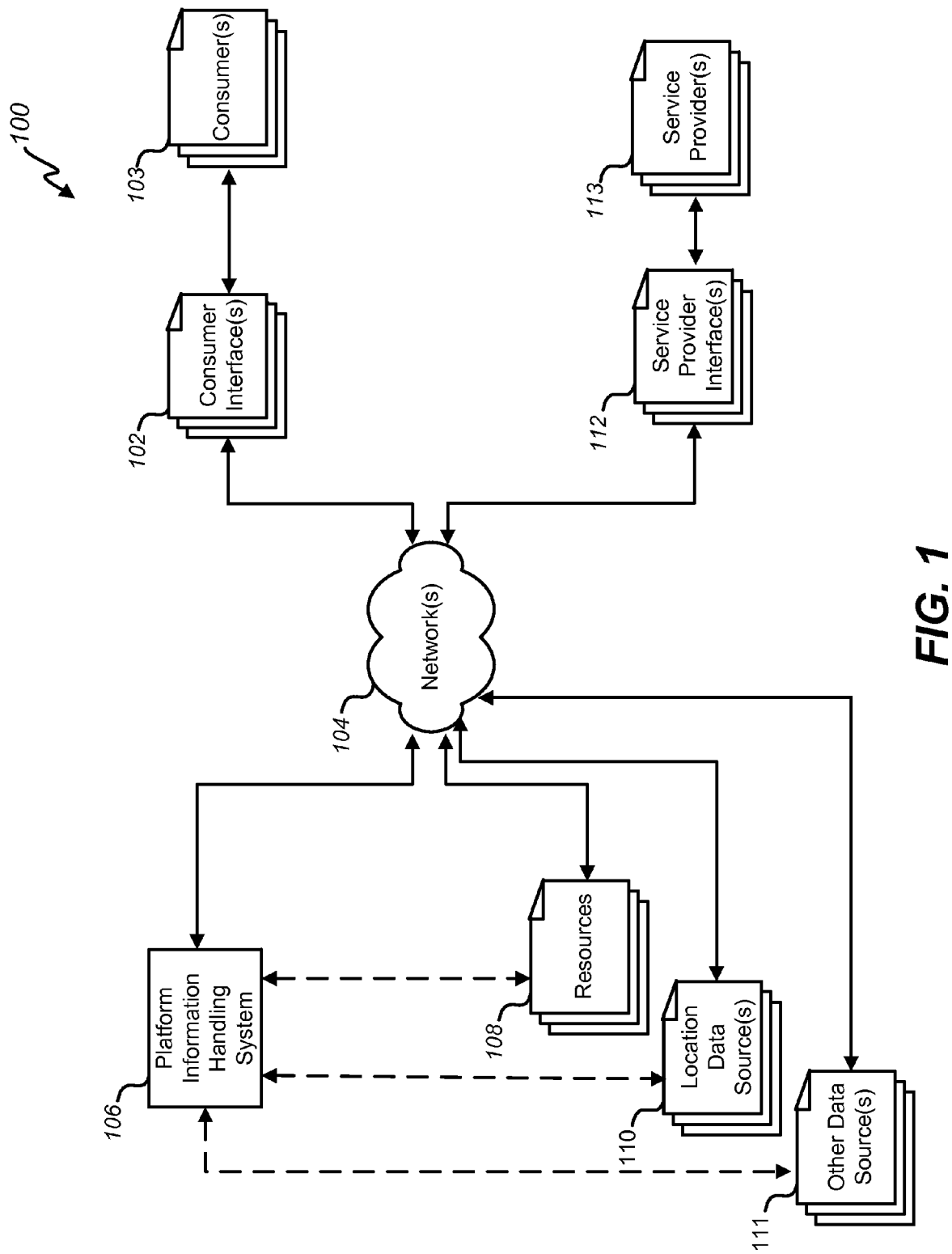
FIG. 1 depicts a high-level block diagram of a platform shape shifter system, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Certain embodiments according to the present disclosure may provide for a system that is configured to provide modular system building blocks that can be used to generate a platform or otherwise provide a platform that handles different verticals. A platform shape shifter could be adaptable to various verticals. Certain embodiments may minimize the cost of entry into a vertical. Certain embodiments may employ state-based programming that could be used to implement platform shape shifting techniques.

Certain embodiments may provide for automated provisioning of service features. Certain embodiments may provide for automated provisioning of resources. In various embodiments, resources may include database resources and/or application services. In some embodiments, the provisioning may be cloud-based. For example, cloud-based services such as any suitable type of SaaS (Software as a Service), PaaS (Platform as a Service), and/or the like may be used to provision service features and/or resources in a cloud environment. In various embodiments, an automated workflow(s) may be provided for choreographing or orchestrating the provisioning.

Various embodiments will now be discussed in greater detail with reference to the accompanying figures, beginning with FIG. 1.

FIG. 1 depicts a high-level block diagram of a platform shape shifter system 100, in accordance with certain embodiments of the present disclosure. The system 100 allows for interaction between two or more of consumer interface(s) 102, consumer(s) 103, service provider interface(s) 112, service provider(s) 113, a platform information handling system 106, and/or resource(s) 108. As depicted, various elements of the system 100 may be communicatively coupled or couplable to one or more networks 104.

The network(s) 104 may be any suitable means to facilitate data transfer in the system 100. In various embodiments, the network 104 may be implemented with, without limitation, one or more of the Internet, a wide area network (WAN), a local area network (LAN), a wireless local area network (WLAN), a metropolitan area network (MAN), a cellular network, such as through 4G, 3G, GSM, etc., another wireless network, a gateway, a conventional telephone network, or any other appropriate architecture or system that facilitates the communication of signals, data, and/or message. The network 104 may transmit data using any suitable communication protocol. The network 104 and its various components may be implemented using hardware, software, and communications media such as wires, optical fibers, microwaves, radio waves, and other electromagnetic and/or optical carriers; and/or any combination of the foregoing. The consumer interface(s) 102, consumer(s) 103, service provider interface(s) 112, service provider(s) 113, a platform information handling system 106, and/or resource(s) 108 may be communicatively coupled or couplable to the network 104 via any suitable communication paths that support the communication protocol(s) used in the various embodiments.

The platform information handling system 106 may facilitate searching of one or more information repositories in response to information received over the network 104 from the consumer interfaces 102 and/or service provider interfaces 112. In various embodiments, the platform information handling system 106 may include any device or set of devices configured to process, send, receive, retrieve, detect, generate, compute, organize, categorize, qualify, store, display, present, handle, or use any form of information and/or data suitable for the embodiments described herein.

The platform information handling system 106 may include a single computing device or multiple computing devices, which, in some embodiments, may be implemented in or with a distributed computing and/or cloud computing environment. The platform information handling system 106 may include one or more processing resources communicatively coupled to one or more storage media, random access memory (RAM), read-only memory (ROM), and/or other types of memory. The platform information handling system 106 may include any one or combination of various input and output (I/O) devices, network ports, and display devices.

In certain embodiments, the platform information handling system 106 may be communicatively coupled or couplable to one or more resources 108. In certain embodiments, the platform information handling system 106 may include one or more resources 108. In various embodiments, the one or more resources 108 may include one or more of database resources, other storage resources, application services, and/or processing resources. Certain embodiments may provide for automated provisioning of resources 108. In some embodiments, the provisioning may be cloud-based. For example, cloud-based services such as any suitable type of SaaS (Software as a Service), PaaS (Platform as a Service), and/or the like may be used to provision resources 108 in a cloud environment. Resources 108 may be linked to the platform information handling system 106 via the network 104 or directly.

A resource 108 may include any suitable input/output module or other system/device operable to serve as an interface between the resource 108 and the network 104 and/or platform information handling system 106. The interface may facilitate communication over the network 104 using any suitable transmission protocol, standard, and/or encryption.

In certain embodiments, the platform information handling system 106 may be communicatively coupled or couplable to one or more location data sources 110. With some embodiments, the one or more location data sources 110 may include one or more mobile computing device locator services that provide information regarding the location of one or more consumer interfaces 102. With some embodiments, the location data sources 110 may provide various details relating to call data. With some embodiments, the location data sources 110 may provide caller name information from calling name delivery (CNAM), also known as caller identification or caller ID, which information may be used to determine particular details about the caller. With some embodiments, the location data sources 110 may provide information about the area in which the caller is located. With some embodiments, the resources 108 may provide demographic data about an area.

In certain embodiments, the platform information handling system 106 may be communicatively coupled or couplable to one or more other data sources 111. The one or more data sources 111 may include any suitable source of data. In various embodiments, the one or more data sources 111 may include one or more of a database, a website, any repository of data in any suitable form, and/or a third party. In various embodiments, the one or more data sources 111 may facilitate, at least in part, a background check process of a service provider. In one exemplary embodiment, the background check process can be performed as a part of a service provider onboarding process, which process is described further herein. A background check process may include one or more of a criminal record check, identity validation, e.g., via social security numbers, sex offender background checks, insurance validation, and/or the like. A background check process could be performed at least in part by a third party, such as a data source 111.

In various embodiments, the data from one or more of the data sources 108, 110 may be retrieved and/or received by the platform information handling system 106 via the network 104 and/or through any other suitable means of transferring data. For example, in some embodiments, the platform information handling system 106 and the data sources 108, 110 could use any suitable means for direct communication. According to certain embodiments, data may be actively gathered and/or pulled from one or more data sources 108, 110, for example, by accessing a third party repository and/or by "crawling" various repositories. With some embodiments, certain of the data pulled and/or pushed from one or more of the data sources 108, 110 may be made available by the platform information handling system 106 for user(s) of the consumer interfaces 102 and/or service provider interfaces 112.

The consumer interfaces 102 and/or service provider interfaces 112 may allow for transfer of and/or access to information in accordance with certain embodiments disclosed herein. In various embodiments, the consumer interface(s) 102 and/or service provider interface(s) 112 may include any suitable input/output module or other system/device operable to serve as an interface between service providers 113, consumers 103, and/or a platform provided by the system. The consumer interfaces 102 and/or service provider interfaces 112 may facilitate communication over the network 104 using any suitable transmission protocol and/or standard. In various embodiments, the platform information handling system 106 may include, provide, and/or be configured for operation with the consumer interfaces 102 and/or service provider interfaces 112, for example, by making available and/or communicating with one or more of a website, a web page, a web portal, a web application, a mobile application, enterprise software, and/or any suitable application software. In some embodiments, a consumer interface 102 and/or service provider interface 112 may include one or more application programming interfaces (APIs).

In some embodiments, a consumer interface 102 and/or a service provider interface 112 may include a web interface. In some embodiments, the consumer interface 102 and/or service provider interface 112 may include or work with an application made available to one or more interfaces, such as a mobile application. In some embodiments, the consumer interface 102 and/or service provider interface 112 may cause a web page to be displayed on a browser of a service provider 113. The web page(s) may display output and receive input from a user (e.g., by using Web-based forms, via hyperlinks, electronic buttons, etc.). A variety of techniques can be used to create the web pages and/or display/receive information, such as JavaScript, Java applications or applets, dynamic HTML and/or AJAX technologies. Accordingly, the platform information handling system 106 may have web site/portals giving access to such information, such as a service provider portal.

In various embodiments, a consumer interface 102 and/or a service provider interface 112 may include providing one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like.

In certain embodiments, a consumer interface 102 and/or a service provider interface 112 may include a computing device of a consumer 103 and/or a service provider 113. In certain embodiments, a consumer interface 102 and/or a service provider interface 112 may include a mobile computing device that may be any portable device suitable for sending and receiving information over a network in accordance with embodiments described herein. In one non-limiting exemplary embodiment, the computing device may include one or more devices variously referenced as a desktop computer, mobile phone, a cellular telephone, a smartphone, a handheld mobile device, a tablet computer, a web pad, a personal digital assistant (PDA), a notebook computer, a handheld computer, a laptop computer, and/or the like. Some embodiments include a landline phone that may not be a computing device.

In some embodiments, the platform information handling system 106 may provide for the selection and provision of advertisements to one or more of consumer interfaces 102, and/or consumers 103. In certain embodiments, one or more service providers 113 may have advertisements that may be placed in a web page made available to one or more consumer interfaces 102. In certain embodiments, one or more service providers 113 may have advertisements that may be displayed with an application made available to one or more consumer interfaces 102, such as a mobile application. The placement of the advertisements may be in accordance with one or more paid placement arrangements and one or more advertising models.

In some embodiments, service providers 113 and consumers 103 may communicate via Voice Over Internet Protocol (VoIP) technology with their respective interfaces. A consumer 103 and a service provider 113 may be communicatively coupled through switches of the network 104, which may include switches of a public telephone network in some embodiments. In some embodiments, one or more service providers 113 could be contacted by a consumer 103 and/or the platform information handling system 106 via various media channels, such as email, chat, instant message, etc., and a service provider 113 could respond via various media channels including, for example, the above listed various media channels. Communication between service providers 113 and consumers 103 may be established via telephonic connection, chat connection, game voice chat, private chat, video chat, videoconferencing, videophone calls, web conferencing, and/or the like.

In some embodiments, a service provider 113 and/or a consumer 103 may use a computing device executing an application module ("app") via which the computing device may communicate with the platform. A service provider 113 and/or a consumer 103 could download an app to his or her computing device that can facilitate communication sessions. With certain embodiments, a mobile application may be made available for execution on a mobile computing device to provide various features described herein. Various embodiments may include a specific purpose-based mobile application or a mobile application integrated with various other mobile application features.

Figure 2:
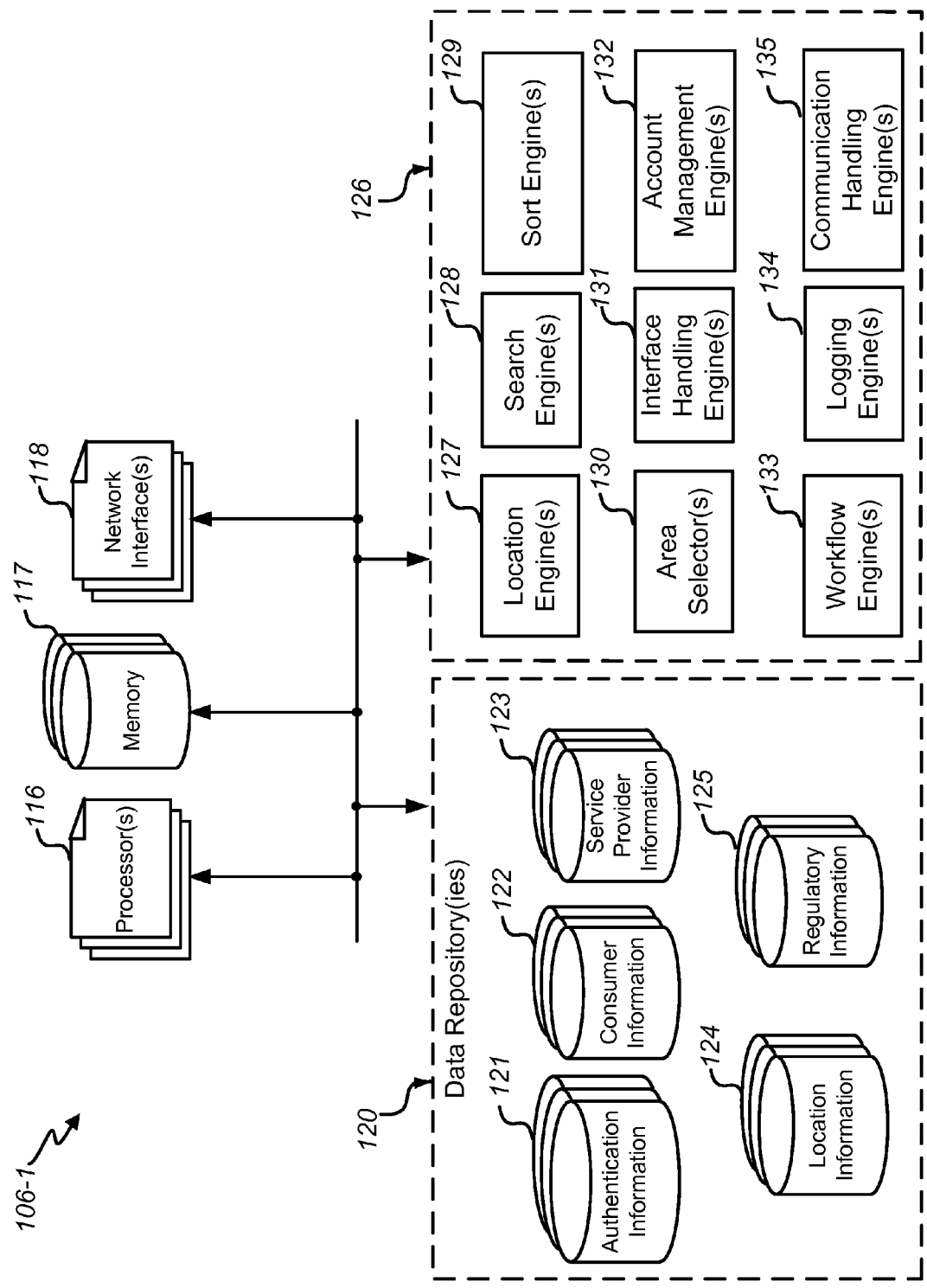
FIG. 2 shows a high-level block diagram of a platform information handling system, in accordance with certain embodiments of the present disclosure.

FIG. 2 shows a high-level block diagram of a platform information handling system 106-1, in accordance with certain embodiments of the present disclosure. The system 106-1 may correspond to the system 106 of FIG. 1, but one embodiment of the platform information handling system 106 is shown in more detail. While engines, repositories, and other components are described separately herein, it should be appreciated that the components may be combined and/or implemented differently in any combination to provide certain features in various embodiments. In various embodiments, different processes running on one or more shared computers may implement some of the components.

The platform information handling system 106-1 may include one or more servers. The one or more servers may include one or more network interfaces 118 communicatively coupled to processors 116. The network interface(s) 118 may include any suitable input/output module or other system/device operable to serve as an interface between one or more components of the service information handling system 106-1 and the network 104. The platform information handling system 106-1 may use the network interfaces 118 to communicate over the network 104 using any suitable transmission protocol and/or standard. In some embodiments, the one or more servers may include one or more web servers, one or more email gateways, one or more instant messaging gateways, one or more telephone gateways, one or more other gateways, such as television gateways, and/or one or more other types of servers, such as an application gateway to interface with different servers. Some embodiments may use one type of communication server, such as a web server, to receive search requests and another type of communication server to provide the search results. Some embodiments may use different types of communication servers to service different types of interfaces 102, 112.

Certain embodiments may provide a multi-channel communication regime to coordinate multiple communication channels used by consumers and service providers. Multiple communication pipes within a communication pipe could be implemented according to certain embodiments. Some embodiments may implement a greater number of communication channels. For example, one set of channels could be used for a consumer to request help, and one set of channels could be used for a service provider to respond to the consumer. The system can use web communication, text communication, voice communication, e-mail communication, push notification, and/or the like.

In some embodiments, a server may communicate with a computing device 102 via HyperText Transfer Protocol (HTTP) and/or other types of communication protocols, such as File Transfer Protocol (FTP), Wireless Application Protocol (WAP), etc. A web server may provide static web pages, dynamic web pages, and/or web services. In some embodiments, a web server may provide web applications to a computing device 102 for execution in a web browser running on the computing device 102, 112; and the web applications may include scripts for execution within an isolated environment in a browser. In some embodiments, the web server may provide rich-client applications to a computing device 102, 112; and the rich-client application may be programmed to have access to functions of the operating system running on a computing device 102, 112.

The platform information handling system 106-1 may include one or more data repositories 120. In various embodiments, the data repository(ies) 120 may be implemented in various ways. For example, one or more data processing systems may store information. One or more relational or object-oriented databases, or flat files on one or more computers or networked storage devices, may store information. In some embodiments, a centralized system stores information; alternatively, a distributed/cloud system, network-based system, such as being implemented with a peer-to-peer network, or Internet, may store information.

In some embodiments, the one or more data repositories 120 may include one or more authentication information repositories 121. The one or more authentication information repositories 121 may retain any authentication information suitable to facilitate security for embodiments of this disclosure. The authentication information repositories 121 may include database(s), database management system(s), server(s) to facilitate management/provision/transfer of authentication information, and/or the like. The repositories 121 may retain authentication information of one or more particular consumers 103, service providers 113, and/or other data sources 108, 110, 111. The authentication information may include information to check credentials of particular consumers 103, service providers 113, and/or other data sources 108, 110, 111 that may use one of their corresponding interfaces to seek access, transfer information, and/or make service-related transactions with platform information handling system 106. The authentication information may be used to provide security for transactions, restrict the access granted to a certain set of information and/or features, implement certain control and/or features for certain parties, and/or the like.

In some embodiments, the one or more data repositories 120 may include one or more consumer information repositories 122. In some embodiments, a computing device 102 may store consumer information. In some embodiments, both the computing device 102 and the online data repository(ies) 122 store the consumer information for a particular consumer 103. In some embodiments, when there is a data communication connection between the computing device 102 and the online data repository(ies) 122, the computing device 102 and the online data repository(ies) 122 may synchronize their copies of the consumer information for the consumer 103. The consumer information may be associated with the corresponding consumers 103. In some embodiments, a consumer 103 may create corresponding consumer information.

In some embodiments, the one or more data repositories 120 may include one or more service provider information repositories 123. The one or more service provider information repositories 123 may retain service provider information of particular service providers. The repositories 132 may retain any information related to service providers. For example, one or more service provider information repositories 123 may retain any information related to service provider identification information, service provider profiles, service provider certification information, service provider licensing information, service provider permit information, service provider pricing information, service provider authentication information, service provider statuses, service provider relationships, organization details, payment methods, accounting information, credit information, asset information, collateral information, address information, contact information, user account information, advertisements, announcements, and/or the like. The service provider information 123 may be associated with location information 124, which may have street addresses or other location parameters, such as longitude and latitude coordinates, stored as locations in one or more location information repositories 124. The location information 124 may be part of the service provider information 123, or associated therewith.

In some embodiments, the one or more data repositories 120 may include one or more regulation information repositories 125. The regulation information repositories 125 may retain any suitable information related to certification, licensing, and/or permit information. The information may include rules for professions, businesses, positions, practices, and/or services, associated with certification, licensing, and/or permit requirements and resources 108, and associated with various jurisdictions.

One or more engines 126 may be used to process a search request and present search results based on the information stored in one or more data repositories 120. The one or more data repositories 120 may include listings information about business entities or public end-user information, or other types of searchable end-user information. The one or more listings information repositories may retain any local listings information suitable for embodiments of this disclosure, such as business, product, and service information. In certain embodiments, the local listings information may correspond to directory information of the kind available via Yellow Pages services and the like.

In various embodiments, one or more of the engines 126 and/or other modules, such as a voice recognition system, may be stored in the one or more memories and may include one or more software applications, executable with the processors, for receiving and processing data requests. In some embodiments, one or more of the engines 126 and/or other modules, may be servers communicating with the communication server(s). The server communication may be over a network, such as a local area network, a wide area network, an intranet, Internet, and/or the like. Any one or combination of the various servers may run on common or separate computers. In some embodiments, there may be one or more layers of application servers between the communication server and the data repository(ies) 120 to process the business logic and data access of the rich client applications. Alternatively, application servers may be integrated with the communication servers, such as the web servers. Certain embodiments are not limited to a particular type of connections among the communication servers, one or more of the engines 126 and/or other modules.

In some embodiments, one computer system implements one or more of the components of the system 106. Alternatively, different processes running on one or more shared computers may implement some of the components. For example, one computing module, thread, or process may implement multiple of the components. In some embodiments, special purpose data processing systems implement the one or more of the components. In some embodiments, processes running according to software instructions on general purpose data processing systems, such as general purpose personal computers or server computers, can implement the components. Thus, the implementations are not limited to particular hardware, software, or particular combinations of hardware and software.

In some embodiments, the location engine(s) 127 may include one or more engines and may use GPS coordinates, cellular tower triangulation techniques, Wi-Fi-based location information, carrier-provided location information, and/or other location determination systems to identify a location of the computing device 102. In some embodiments, the location engine 127 determines a location of interest to the consumer 103 related to a search request. The location of interest may be based on a location of the computing device 102. In some embodiments, the consumer 103 may explicitly specify the location of interest in a search request; and the location engine 127 extracts the location of interest from the search request. In some embodiments, a location of interest may be based on end-user information stored for a particular consumer 103 and associated with identification information of the consumer 103 or the computing device 102. In some embodiments, the consumer 103 may specify some or all of the end-user information.

In some embodiments, the location engine 127 may automatically identify the location of interest based on the current location of the computing device 102 used to submit a search request and/or initiate a phone call. For example, the location engine 127 may determine the location of the computing device 102 based on a connection point used by the computing device 102 to access the network 104 (e.g., based on the location of a wireless network access point, a base station of a cellular communication system, or a connection point to a wired network). In some embodiments, the computing device 102 automatically determines its current position (e.g., via a satellite positioning system, or a cellular positioning system) and transmits the determined or estimated position to the system 106 with the search request, or provides the position in response to a request from the location engine 127.

In some embodiments, the search engine 128 may retrieve information from the data repository(ies) 120 according to a search request. The search engine 128 may include logic for implementing searching of one or more information repositories. Other engines 126 may include and/or utilize the search engine 128 in various embodiments. The searching may be in response to information received over the network 104 from a user. Responsive to a query, the search engine 128 may search, retrieve, modify, and/or cause transfer of particular information from one or more information repositories.

A sort engine 129 may rank the information in accordance with embodiments discussed herein. In various embodiments, the area selector 130 may be configured to select areas of interest in accordance with various embodiments described herein. In some embodiments, the area selector 130 may select a first geographic area based on the location of interest identified by the location engine 127. The search engine 128 may then retrieve a first set of service provider information that have corresponding locations within the selected first geographic area and that satisfy the search criteria. In some embodiments, the search engine 128 may search for service provider information in a target area to obtain a set of search results; the area selector 130 may select geographic areas and may select groups of results that are within the selected geographic areas respectively.

In some embodiments, the interface handling engine(s) 131 may include logic to send, present, and receive information, with one or more of the interfaces to/from one or more consumers, service providers, and/or data sources. The interface handling engine(s) 131, with one or more the processors 116, may utilize one or more network interfaces 118 to transceive information through the network 104. The system 106 may pull and/or push information from those entities in any suitable way.

In some embodiments, the account management engine(s) 132 may include logic for implementing account features in various embodiments. By way of example without limitation, the account management engine(s) 132 may include logic for one or more aspects of: handling user registration; managing account creation, updates, authentication, handling; handling buyer deposit accounts; handling buyer credit accounts; and/or the like. The account management engine(s) 132 may be configured for acquiring, processing, formatting, and/or storing authentication information in the one or more authentication repositories 121.

In some embodiments, the service management workflow engine(s) 133 may include logic for implementing service management workflow features in various embodiments. By way of non-limiting example, the service management workflow engine(s) 133 may include logic for one or more aspects of: creating, changing, and storing consumer and service provider profiles; presenting and handling service provider options; handling consumer requests; and/or the like. In some embodiments, notification engine(s) may include logic for implementing notification features. By way of example without limitation, the notification engine(s) may include logic for one or more aspects of: generating and sending notifications to platform users; receiving responses from platform users; coordinating responses and extracting pertinent information therefrom; alerting consumer and service providers regarding events of interest; and/or the like. The notification engine(s) 134 may be configured to check consumer and/or service provider notification profiles for handling notifications in accordance therewith. In some embodiments, the service management workflow engine(s) 133 may include the notification engine(s).

In some embodiments, the logging engine(s) 134 may include logic for implementing information logging features in various embodiments. By way of example without limitation, the logging engine(s) 134 could process data pulled and/or pushed from various entities. The logging engine(s) 134 could handle process, extracting, formatting, and/or storing data may in one or more of the aforementioned repositories.

In some embodiments, the call handling module(s) 135 may be configured to one or more of decode, route, and redirect calls from consumers to service providers. Aspects of the call handling module(s) 135 are further discussed herein.

Figure 3:
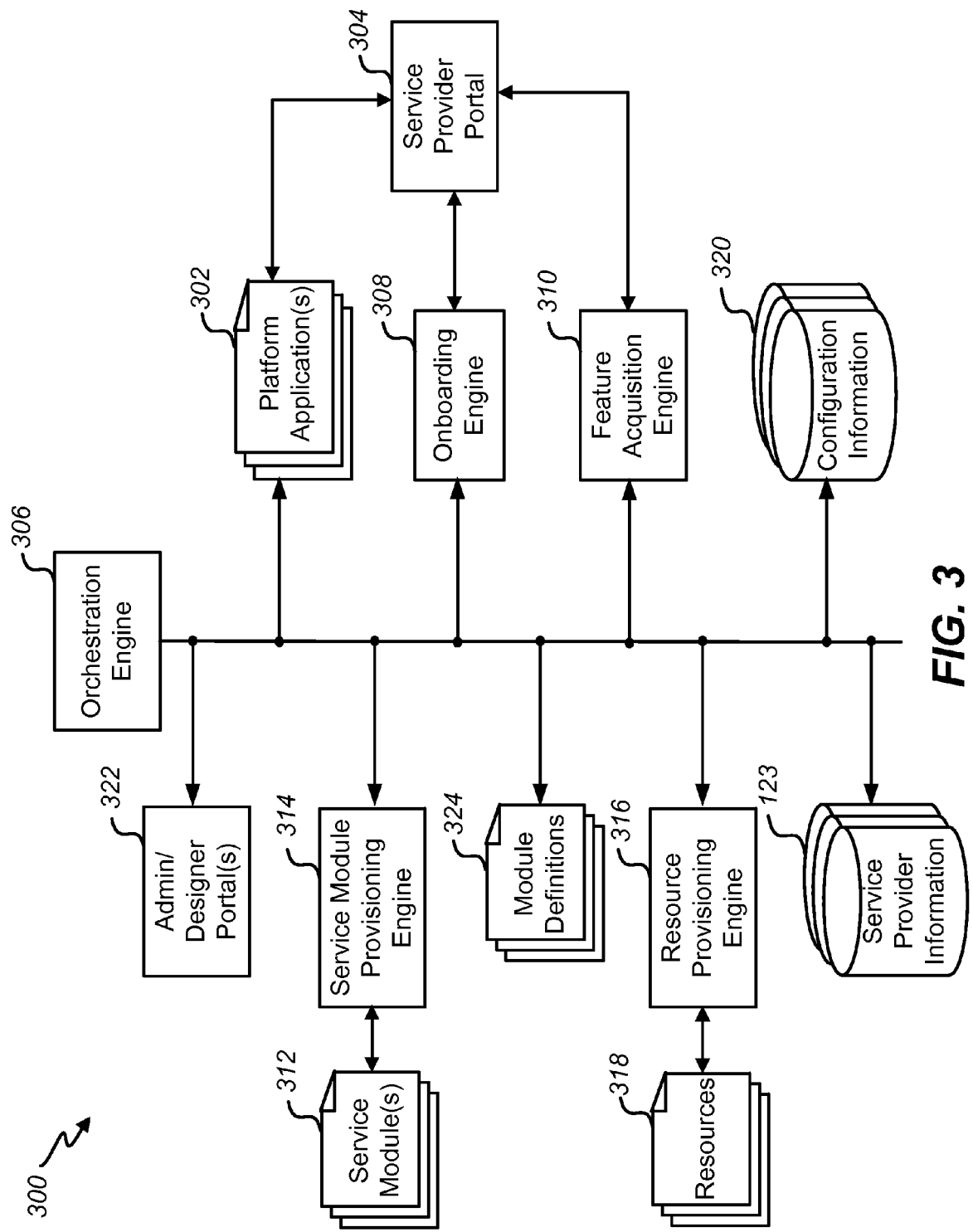
FIG. 3 depicts a high-level block diagram of a platform shape shifter system, in accordance with certain embodiments of the present disclosure.

FIG. 3 shows a high-level block diagram of a platform shape shifter system 300, in accordance with certain embodiments of the present disclosure. The system 300 may correspond to aspects of the system 100 of FIG. 1, but certain aspects are shown in more detail. In various embodiments, various components of the system 300 could be coupled via one or more wired or wireless networks (not shown). While engines, repositories, and other components are described separately herein, it should be appreciated that the components may be combined and/or implemented differently in any combination to provide certain features in various embodiments. In various embodiments, different processes running on one or more shared computers may implement some of the components. There can be many different platform configurations provided by the platform shape shifter systems 300 that are customized for particular requirements of a particular business vertical and/or a particular service provider. Different verticals and service provider will have different customizations according to desired functionality, service requirements, regulatory requirements, etc.

A platform shape shifter system 300 may allow for the provisioning of multiple subsystems and/or service modules with architecture connections to interact in providing a customized platform 302 with which a service provider can service consumers in a particular business vertical. Multiple subsystems and/or service modules may be selected by a service provider via a service provider portal 304 and grafted into a platform 302 to enable desired functions. A platform deployment orchestration engine 306 may be a component that handles the overall process of the automated configuring of a platform 302. The platform deployment orchestration engine 306 may serve as a task manager and may implement workflows and translation of information such that the platform 302 integrates functions cohesively. In some embodiments, the platform deployment orchestration engine 306 may interface with other components based on SOAP, BPEL, and/or any other suitable protocol and language. Though certain aspects corresponding to system 100, including platform information handling system 106, are not depicted in system 300 for the sake of simplicity, it is to be understood that system 300 and platform 302 may utilize any combination of components thereof to provide features according various embodiments of the present disclosure.

A service provider onboarding engine 308 may manage an onboarding process for a service provider. The service provider portal 304 may facilitate service provider onboarding. The information gathered and set up via onboarding may be retained in appropriate repositories 120 in certain embodiments. In various embodiments, the onboarding process may include providing one or more display screens that may each include one or more user interface elements. One or more automated process flows may facilitate the provisioning of service providers with one or more accounts and/or registrations. Service provider accounts may be created in various ways in various embodiments. For example, account creation may be initiated by the system which can initiate onboarding by automatically identifying the service provider and sending a service provider a notification with a link, inviting the service provider to register. In certain cases, an existing service provider may already be in the system, and either the service provider or the system may request registration. Along with the registration, a service provider account may be created so that the service provider can be presented with a profile setup flow.

A profile setup flow may include a page flow presented to the service provider to acquire information from the service provider and ensure that the service provider fills out a profile. A service provider profile may include any suitable information, such as information regarding a service provider's business hours, specialties, types of payments that are receivable, contact information, billing information, certification information, information on locations, and/or the like. A service provider profile may include persistent information that is maintained about a service provider and/or service provider site. A service provider profile may include any data stored in a service provider information repository and can include, for example, data that is part of the profile as shown to a service provider via a service provider portal and/or data that is not part of the profile as shown to a service provider via a service provider portal.

With the profile setup flow, a service provider may be able to indicate specific services for which the service provider provides service. The service provider could also indicate, implicitly or explicitly, specific services which the service provider does not provide. With the provider profile, a service provider may be able to indicate specific service areas for which the service provider provides service. In various embodiments, a service area could have any suitable parameters, e.g., including one or more counties, municipalities, zip codes, distances from reference points, etc. In some embodiments, a user-selectable map interface may be presented to a service provider, enabling the service provider to define a service area by selecting one or more points on the map interface. For example, predefined service areas, such as zip codes and/or the like, could be presented on the map for selection. The map interface could allow a service provider to define a perimeter of a service, e.g., by drawing on the map with a line drawing tool, cursor, finger/stylus contact with a touch interface, selection of perimeter boundaries such as roads, rivers, etc.

In some embodiments, the provider profile may include a notification profile. The notification profile may specify parameters for notifying the service provider. In some embodiments, the platform may send a notification to a service provider, which notification, for example, could be provided via a service provider dashboard that can be provided via the platform. However, any suitable means of notification may be employed including, for example, text, voice, e-mail, alerts with the application, and/or the like. The notification could include a link or other communication referring back to the platform, prompting the provider to respond. For example, the notification could provide a link for users to log into the platform to respond. In some embodiments, the service provider may respond via the same medium in which the notification was sent (e.g., text, voice, e-mail, etc.), and the system may process the response, extracting requested information.

Certain embodiments may provide a level of control to service providers to select particular service features. Certain embodiments may expose a list of service features to allow the service to make service feature selections. Any suitable means of presenting user-selectable options and/or information entry/indication options may utilized in various embodiments. The page flow may present text entry fields and/or graphical selection options. Multiple user-selectable options and/or information entry/indication options may be presented to the service provider. The page flow may utilize a decision tree in some cases. The decision tree may be followed to classify service features; classifications options may flow from more general classifications to more specific subclassifications to any suitable degree of specificity. In some embodiments, an auditing function, of the platform deployment orchestration engine 306, for example, may validate combinations of selected features to ensure logical compatibility of the features.

A feature acquisition engine 310 may manage acquisition of service provider selections for a desired platform 302. The feature acquisition engine 310 may manage a feature selection flow presented to the service provider to gather provider selections of desired resource options. The feature selection flow may include a navigation menu flow presented with a GUI for the service provider to select different service features and functions. The feature acquisition engine 310 may apply business rules to check and shepherd the acquisition processes.

Based on the gathered acquisition information, the platform deployment orchestration engine 306 may identify service modules 312 to provide functionalities corresponding to service provider selections of desired service features and obtain the corresponding service module instances. A service module provisioning engine 314 may handle the provisioning of service module instances 312. The service module instances 312 may be functional units that can be individually selected to be part of the customized platform 302 that provides desired functionalities. The service module instances 312 may perform any suitable function to facilitate desired service features. Accordingly, the platform 302 may provide desired functionalities tailored to service needs of a particular service provider in a particular business vertical.

A resources provisioning engine 316 may assign resources 318 based at least in part on the service provider selections to facilitate the desired service features. The resources 318 may correspond to certain of the data and/or processing resources of and/or available to platform information handling system 106 in certain embodiments. For example, the platform deployment orchestration engine 306 may indicate service selections, corresponding service modules, and/or the like to the service module provision engine 314, and may obtain corresponding service module instances 312 from the service module provision engine 314. The platform deployment orchestration engine 306 may indicate service module instances to the resources provisioning engine 316, and may assign or obtain assigned resources 308 from the resources provisioning engine 316.

The platform deployment orchestration engine 306 may arrange and configure the service module instances 312 and assigned resources 318 with architecture connections to interact and cooperate to provide the functionalities of the customized platform 302. Having grafted the service module instances 312 with the platform 302, the platform deployment orchestrator 306 may configure the user interfaces associated with the platform 306, the service provider interface(s) and the consumer interface(s), to provide the functionalities specified. The platform application(s) 302 may run in an application layer of an operating system(s) running on a special-purpose computer(s) to provide the desired functionalities. In some embodiments, the platform 302 may be instantiated with a virtual machine. A graphical user interface preview of the service provider interface and/or the consumer interface may be presented to a service provider for inspection, rearrangement and customization, and approval.

One or more configuration information repositories 320 may store configuration information for the platform 302. The information repositories 320 may correspond to certain of the repositories 120 in certain embodiments. The various functions 312 may use configuration parameters and information on how to interact with those functions 312 that may be stored in the configuration information repository 320. Information for grafting functions 312 may include API translation information in some embodiments. The configuration repositories 320 may be modifiable by system administrators/developers via an administrator and/or developer portal 322 to modify operations of the functions 312.

The portal(s) 322 may be used to program or reconfigure aspects of the system 300. There could be different levels of access provided via the portal 322. Administrators/developers may modify functions 312 through a module definition function 324. The designer may select service may configure module definitions 324 for corresponding service modules 312 according to any desired requirements. In some embodiments, the portal 322 may provide for a manual review option of configurations set up via the automated provisioning processes by an administrator, if desired.

Figure 4:
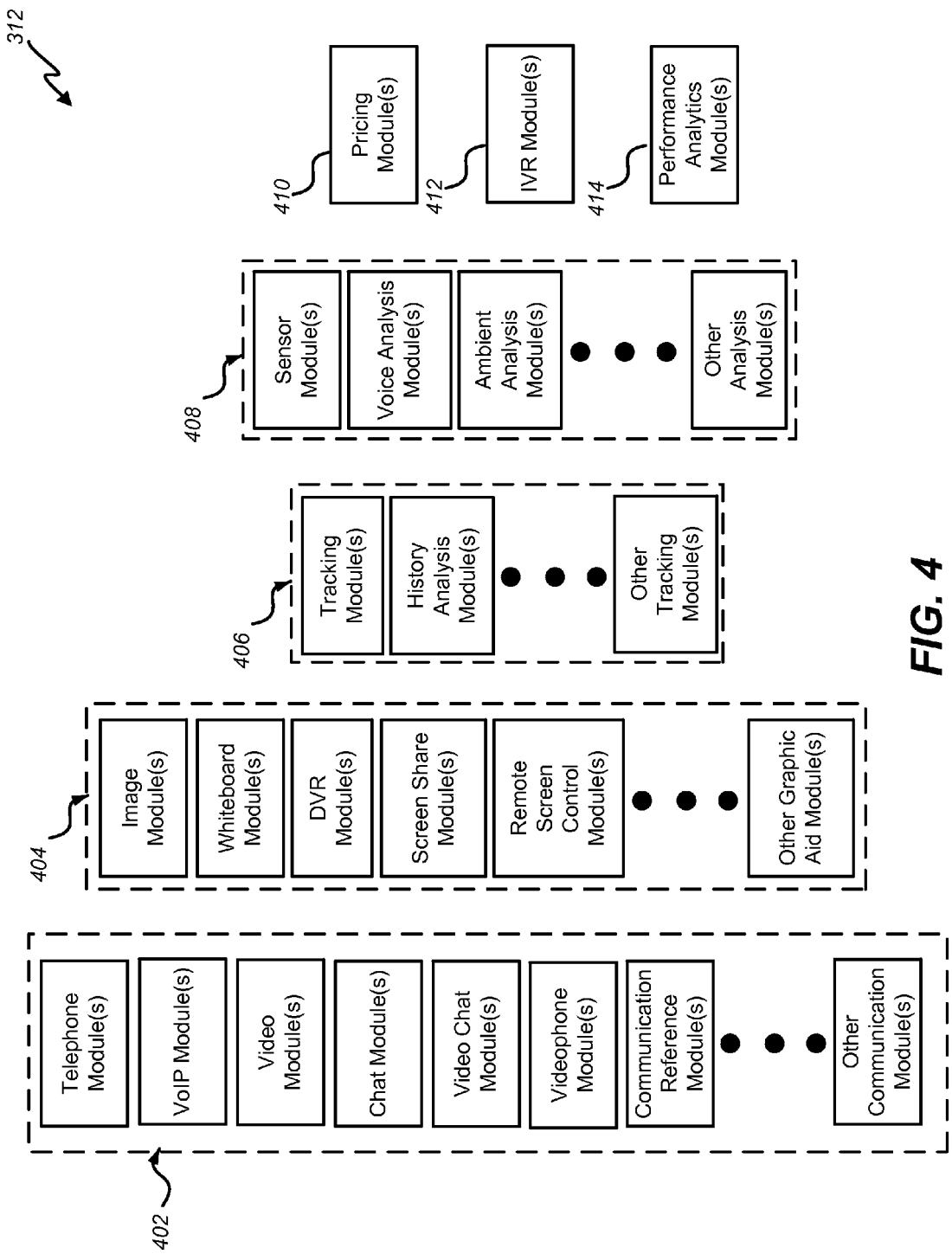
FIG. 4 shows a block diagram of various exemplary service modules that can be selected for a platform configured with the platform shape shifter system, in accordance with certain embodiments of the present disclosure.

FIG. 4 shows a block diagram of various service modules 312 that can be selected for a platform configured with the platform shape shifter system, in accordance with certain embodiments of the present disclosure. The service modules 312 depicted are provided by way of example and are not an exhaustive identification of various service modules 312 that can be implemented with various embodiments.

Instances of the service modules can be added or removed from a platform configuration via the platform shape shifter system. The service modules can be customized for given implementations. For example, an administrator or developer may change module definitions to implement any desired functionalities, generally or for specific implementations for a particular vertical and/or service provider.

Any suitable type of communication modules 402 may be provided for selection. Various communication modules 402 may allow for various communication features via telephonic connection, chat connection, game voice chat, private chat, video chat, videoconferencing, videophone calls, web conferencing, and/or the like. The communication modules 402 may allow for configuring the platform to allow features based on any suitable communication reference. For example, in various embodiments, the platform may facilitate interfacing between a service provider and customers via any suitable one or combination of any suitable communication references, which may include a text number, a click-to-text option, a phone number with or without an extension, a click-to-call option, an email address, a click-to-email option, a click-to-reveal reference, a SIP address for a VoIP call, and/or the like. A communication reference may be implemented with any suitable type of advertisement product that may be offered. The advertisement products may include, for example, pay-per-call ads, presence ads, cost per click, cost per impression ads, display ads, and/or the like in any suitable type of medium, including print, web, mobile, video, television, social, and/or the like.

Any suitable type of graphical aid modules 404 may be provided for selection. Various graphical aid modules 404 may allow for various features that allow a service provider and/or consumer to view, upload, download, markup images, or otherwise handle still images. In some embodiments, the graphical aid modules 404 can facilitate communication between the service provider and the consumer. The graphical aid modules 404 could allow for a whiteboard feature allowing a service provider and/or consumer to write or draw on the whiteboard. Modules could allow for DVR features which can allow video content to be buffered and/or otherwise recorded to facilitate analysis and advising. In some embodiments, graphical aid modules 404 could allow for a service provider to view, and control at least a portion of the screen display that a consumer is viewing.

Any suitable type of tracking modules 406 may be provided for selection. One or more tracking modules 406 may allow for tracking of information regarding consumers. As discussed herein, tracked information could include information relating to equipment that a consumer uses and has used to interface with one or more service providers. In various embodiments, a service provider platform may track calls, messages, billing, etc. and enable service providers to interact with the platform to retrieve, see, and use the data. As discussed herein, certain embodiments may provide for a consumer history engine that manages, collects, retrieves, updates, and/or retains information relevant to a particular consumer. Certain embodiments may automatically identify a caller, correlate the caller to a consumer profile, and provide consumer profile information to the service provider to enrich the assistance session by making consumer profile information available to the service provider. Consumer profile information may provide the service provider with valuable context. For each consumer, a dossier for a consumer can be compiled and made available to a service provider to facilitate assistance the consumer.

Any suitable type of analysis and/or sensing modules 408 may be provided for selection. One or more sensor modules may allow for any one or combination of the sensor-based features discussed herein. One or more analysis features may allow for any one or combination of voice analysis, ambient analysis, and/or the like features discussed herein.

One or more pricing modules 410 may be provided for selection. Pricing modules 410 could implement various pricing features for communications between service provider and consumer such as a flat fee, rates per time period, certain free periods, free to charge transitions, price escalations/de-escalations for transitions between various types of service options during a communication session, and/or the like.

One or more IVR modules 412 may be provided for selection. The IVR modules 412 may allow for customization of call handling according to the service provider's preferences. One or more performance analytics modules 414 may be provided for selection. The performance analytics modules 414 may allow for processing performance data associated with the service providers and/or other service providers in the same vertical. For example, call statistics features could allow for tracking and analysis of details about calls per particular consumer, calls per particular location, calls using a particular number, missed calls, dropped calls/calls receiving a busy tone, call-back statistics, call lengths, and/or the like. Any number and type of other modules 312 are possible, including modules to facilitate other service features discussed further herein.

Figure 5:
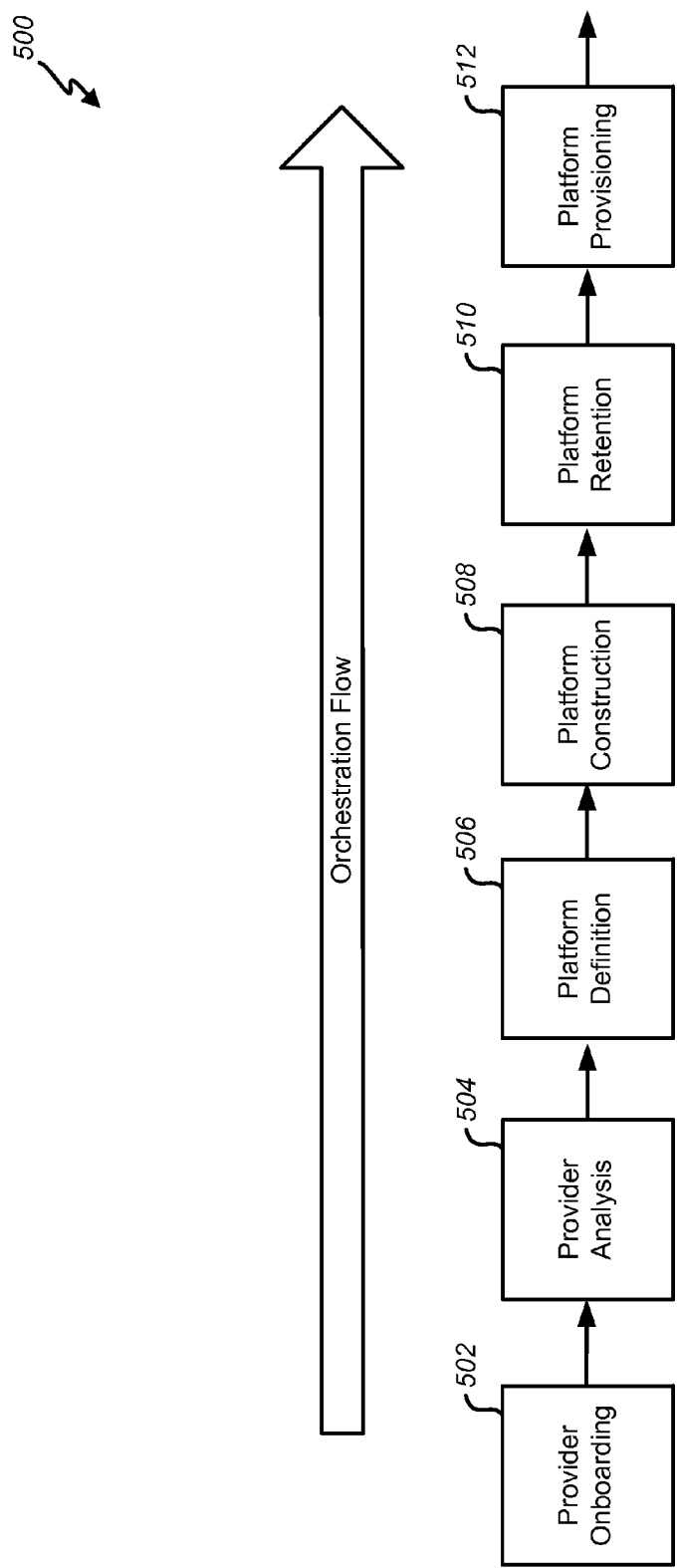
FIG. 5 is a block diagram that illustrates certain aspects of platform orchestration flow, in accordance with certain embodiments of the present disclosure.

FIG. 5 is a block diagram 500 that illustrates certain aspects of platform orchestration flow, in accordance with certain embodiments of the present disclosure. Diagram 500 may represent an overview of certain aspects of such a lifecycle, including overall flow stages involved. Teachings of the present disclosure may be implemented in a variety of configurations. As such, the order of the aspects comprising the lifecycle may be shuffled in any suitable manner and may depend on the implementation chosen. Moreover, while the following aspects may be separated for the sake of description, it should be understood that certain steps may be performed simultaneously or substantially simultaneously.

One aspect of the flow may correspond to a set of interactions with a prospective provider in a provider onboarding phase 502. Such onboarding may include identifying a provider as possibly interested in tailored platform. In some cases, a provider may initiate platform provisioning. In some cases, the system may prompt a provider to initiate platform provisioning. Information enabling unique identification of a provider may be gathered, processed, and retained. As part of the on boarding process, profile information may be gathered with respect to a particular provider.

One aspect of the flow may correspond to a provider analysis phase 504. Information with respect to a particular provider may be analyzed in order to identify one or more provider attributes. The analysis may include determining one or more categories to which the provider belongs. The provider may be matched to one or more categories that each represent classifications of providers sharing common attributes.

One aspect of the flow may correspond to a platform definition phase 506. A set of platform features may be identified. In some embodiments, the set of platform features may be identified based at least in part on one or more provider attributes and/or one or more provider categories. In some embodiments, information about at least part of the set of service features may be exposed to the provider with corresponding user-selectable options to inform the provider regarding service features and to enable the provider to select/de-select service features. The backend system may process one or more indications of user selection of one or more service features. Accordingly, a customized set of service modules may be based at least in part on the user selection.

A set of service modules corresponding at least partially to an identified set of platform features (whether simply system-identified or user-customized according to the particular embodiment) may be determined. The system may generate a definition of the particularized platform configured to interact with the set of service modules to provide the one or more service features. The system may generate a plan to provide the platform with the set of service modules based at least in part on the definition. The definition and the plan may be retained in one or more repositories.

One aspect of the flow may correspond to a platform construction phase 508. A platform application may be configured to provide the tailored platform based at least in part on the plan and the definition. The set of service modules may be integrated into the first platform application using one or more component interfaces. Processing resources and/or database resources may be allocated to the platform application based at least in part on the plan.

One aspect of the flow may correspond to a platform retention phase 510. The configured resources, application, and modules may be retained, for example, in the cloud for provisioning to the provider and on behalf of the provider to consumers. One aspect of the flow may correspond to a platform provisioning phase 512. User access to the provider-specific platform may be enabled via the network.

Figure 6:
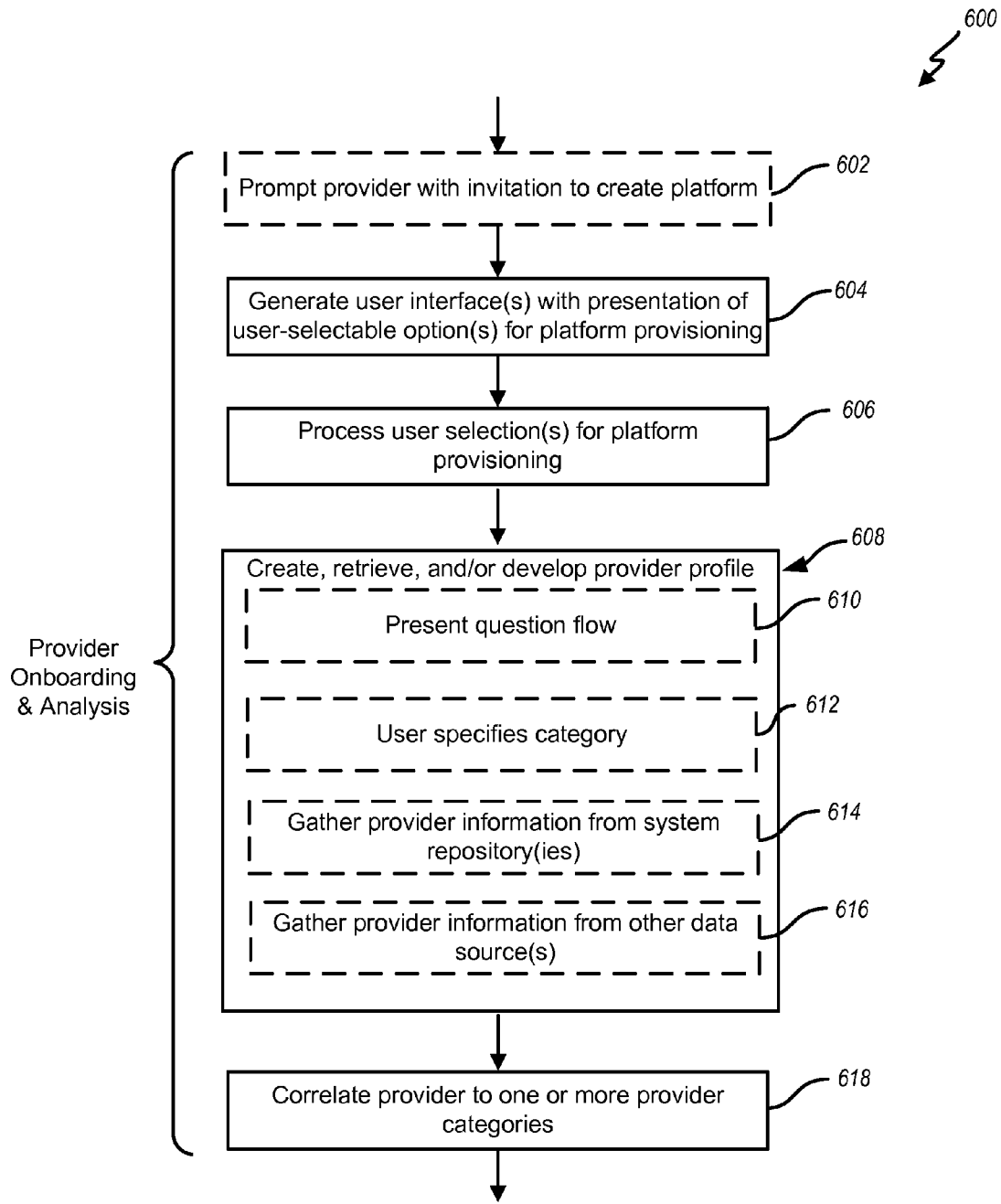
FIG. 6 illustrates an example method of provider onboarding and analysis, in accordance with certain embodiments of the present disclosure.

FIG. 6 illustrates an example method 600 of provider onboarding and analysis, in accordance with certain embodiments of the present disclosure. Teachings of the present disclosure may be implemented in a variety of configurations that may correspond to the systems disclosed herein. As such, certain steps of the method 600, and the other methods disclosed herein, may be omitted, and the order of the steps may be shuffled in any suitable manner and may depend on the implementation chosen. Moreover, while the following steps of the method 600, and those of the other methods disclosed herein, may be separated for the sake of description, it should be understood that certain steps may be performed simultaneously or substantially simultaneously.

According to one embodiment, the method 600 may begin as indicated by block 602. As indicated by block 602, in some embodiments, a provider may be prompted with invitation to create a platform. An invitation may take any of various suitable forms, and a provider may be identified in any suitable manner. For example, a provider may be identified as already associated with the system but not yet having a tailored platform. Accordingly, in some cases, the system may prompt a provider to initiate platform provisioning. However, in some cases, a provider may initiate platform provisioning.

As indicated by block 604, one or more user interfaces may be generated to provide one or more user-selectable options for platform provisioning. An interface provided by the system may facilitate an onboarding phase. In various embodiments, such an interface may include providing one or more display screens that may each include one or more user interface elements. An interface may include any text, image, and/or device that can be displayed on a display screen for providing information to a user and/or for receiving user input. An interface may include one or more widgets, text, text boxes, text fields, tables, grids, charts, maps, hyperlinks, buttons, lists, combo boxes, checkboxes, radio buttons, and/or the like.

As indicated by block 606, one or more user selections for platform provisioning may be processed. The user selections may include initiations of the onboarding and/or provisioning process. The user selections may include selections corresponding to provider information and/or preference gathering. As indicated by block 608, a provider profile may be created, retrieved, and/or developed. Information enabling unique identification of a provider may be gathered, processed, and retained. Profile information may be gathered with respect to a particular provider as part of the onboarding process. In some embodiments, the onboarding may include a provider registration and/or certification stage. In some embodiments, one or more automated process flows may facilitate the provisioning of prospective providers with accounts and registration. Accounts may be created in various ways in various embodiments. For example, account creation may be initiated by the system. The system could initiate onboarding by automatically identifying the provider and presenting a communication reference, such as a link, inviting the provider to register and create an account. The onboarding may include a profile stage, which may include a process of ensuring profile completion. A profile may include information regarding a provider's certifications, permits, licenses, experience, hours of availability, specialties, proficiencies, types of payments that are receivable, contact information, notification preferences, device configurations/capabilities, billing information, certification information, information on locations, and/or the like. A profile may include persistent information that is maintained about a provider. A profile may include any data stored in an information repository whether or not it is part of the profile exposed to a provider. With the profile, a provider may be able to indicate specific services/products which the provider is to provide. The provider could also indicate, implicitly or explicitly, specific services/products which the provider does not provide.

In some embodiments, the profile may include a notification profile. The notification profile may specify parameters for notifying the provider, and could also specify parameters for provider responses to notifications from the system, such as a notification regarding an incomplete profile or issues with certification, insurance, and/or the like. In some embodiments, the platform may send a notification to a provider, which notification, for example, could be provided via a provider dashboard provided via the platform. However, any suitable means of notification may be employed. For example, text, voice, e-mail, alerts with the application, and/or the like could be sent. The notification could include a link or other communication reference referring back to the platform, prompting the provider to respond. For example, the notification could provide a link for users to log into the platform to respond. In some embodiments, the provider may respond via the same medium in which the notification was sent (e.g., text, voice, e-mail, etc.), and the system may process the response, extracting requested information.

In some embodiments, as indicated by block 610, one or more questions may be presented to the provider to gather provider information. An automated workflow may include a series of questions, the answers to which, as provided by user selections, may be used for provider analysis, e.g., to identify one or more attributes/characteristics of the provider, to categorize the provider, and/or to otherwise characterize the provider. In some embodiments, as indicated by block 612, the provider may specify or otherwise indicate one or more categories to which the provider belongs. Some embodiments may present information and user-selectable options to facilitate categorization of the provider. Additionally or alternatively, as indicated by block 614, provider information may be gathered from one or more information repositories of the system. In some cases, the provider may have been previously associated with the system such that certain provider information has already been gathered and retained. Thus, previously identified provider information may be accessed to facilitate analysis of the provider. Additionally or alternatively, as indicated by block 616, provider information may be gathered from one or more other data sources. Some embodiments may provide for porting of information from a provided-managed repository of information. Some embodiments may provide for options for user initiation of porting information; some embodiments may perform the process automatically. In various embodiments, provider information may be gathered from any suitable data source, which may include any one or more or combination of a database, a website, any repository of data in any suitable form, and/or a third party. According to certain embodiments, provider information may be actively gathered and/or pulled from data sources, for example, by accessing/crawling a data source repository.

As indicated by block 618, the provider information may be correlated to one or more provider categories. In some embodiments, the system may include a matching engine that can receive provider information, identify attributes of the provider based at least in part on the provider information, and match the provider to one or more categories from a category information repository. In some embodiments, one or more taxonomies that map particular profile information to particular categories may used in correlating provider profile information with one or more categories.

Figure 7:
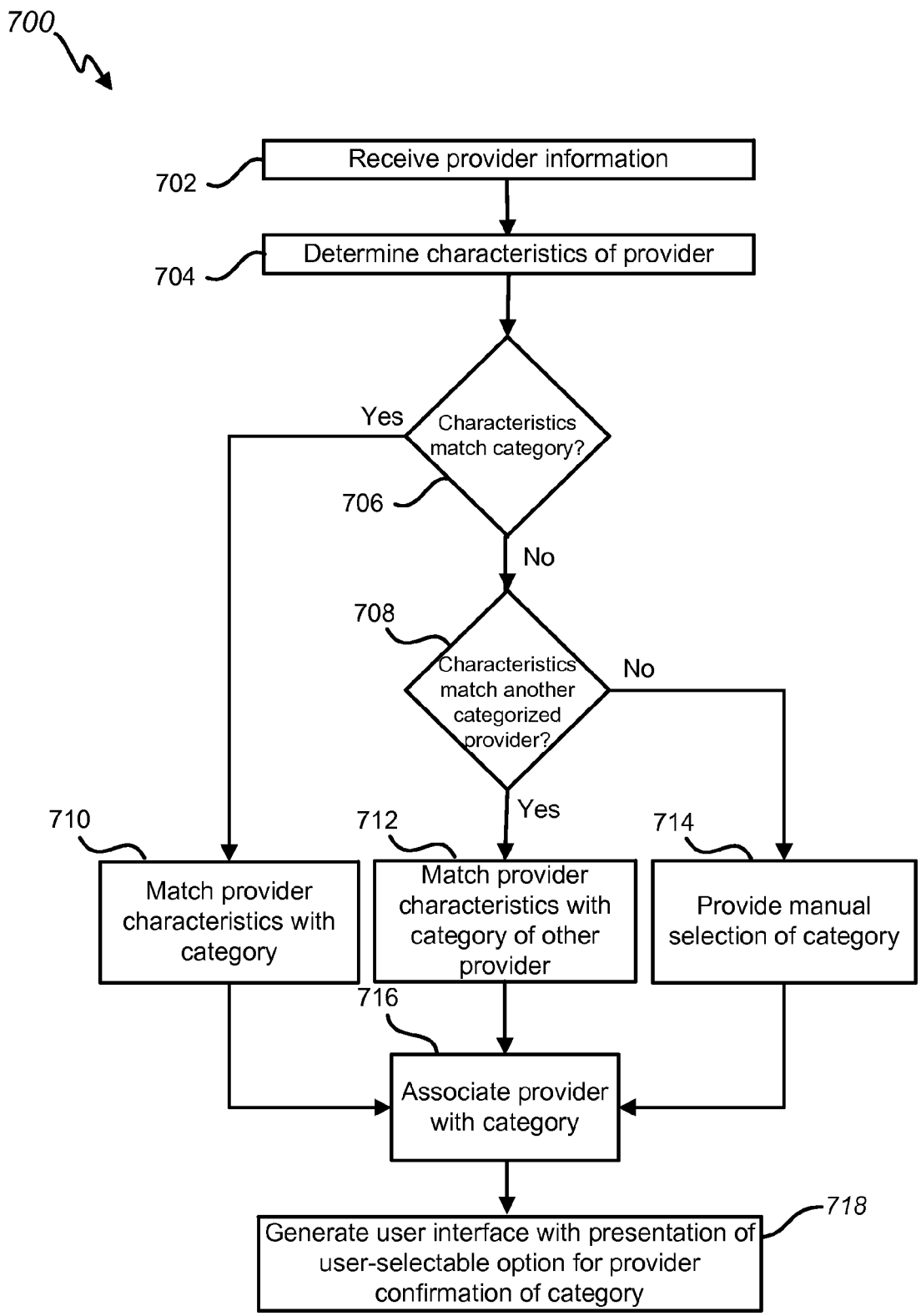
FIG. 7 illustrates a flowchart of a method of provider categorization, in accordance with certain embodiments of the present disclosure.

FIG. 7 illustrates a flowchart of a method 700 of provider categorization, in accordance with certain embodiments of the present disclosure. This and/or other methods disclosed herein may be performed in whole or in part by the information handling system and/or a client application, and may be facilitated the provider interface(s). As indicated by block 702, provider information may be received. For example, the system may receive provider information as discussed herein.

As indicated by block 704, one or more characteristics of the provider may be determined. For example, the system may determine characteristics such as products or services provided, customers served, market, location, etc. based on the provider information gathered. As indicated by block 706, it may be determined whether one or more of the characteristics match characteristics associated with one or more categories. If so, as indicated by block 710, one or more provider characteristics may be matched with one or more categories. Then, as indicated by block 716, the provider may be associated with the one or more categories. Information about the categorization of providers may be retained by the system, for example, in one or more information repositories.

However, if it is not determined that one or more of the characteristics match characteristics associated with one or more categories, it may be determined whether one or more of the characteristics match another already categorized provider, as indicated by block 708. The one or more characteristics can be compared with other providers. If characteristics match with a second provider exceeds a threshold, the provider can be determined to match with the category of the second provider, as indicated by block 712. Then, as indicated by block 716, the provider can be associated with the category of the second provider.

However, if it is not determined that the provider characteristics match other provider characteristics, a representative can provide a manual selection of a category, as indicated by block 714. In some embodiments, manual selection can be made by a representative associated with the system; in some embodiments, manual selection can be made by the provider (which term, as used herein, includes representatives associated the provider). A manual selection having been made, the provider can be associated with the selected category, as indicated by block 716. In some embodiments, as indicated by block 718, a user interface with presentation of user-selectable option(s) may be generated to allow for confirmation of the one or more categories. The user interface may be exposed to the provider for provider confirmation.

Figure 8:
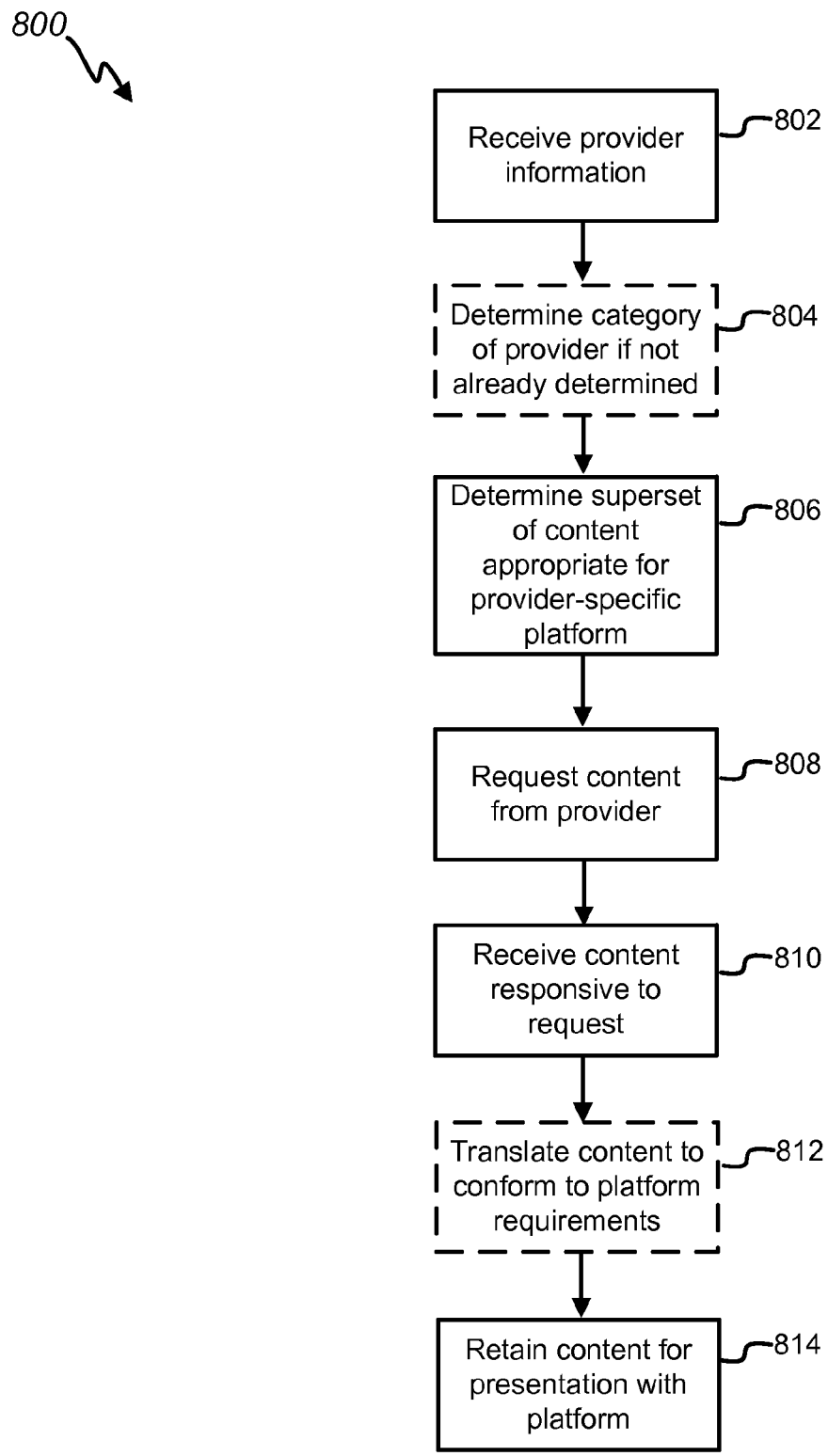
FIG. 8 illustrates a flowchart of a method of provider content handling, in accordance with certain embodiments of the present disclosure.

FIG. 8 illustrates a flowchart of a method 800 of provider content handling, in accordance with certain embodiments of the present disclosure. As indicated by block 802, provider information may be received. For example, the system may receive provider information as discussed herein. As indicated by block 804, a category of the provider may be determined in some cases. For example, if the provider has not already been associated with one or more categories, the system may correlate provider information to one or more categories accordance with any one or combination of various embodiments.

As indicated by block 806, a superset of content may be determined. The system, having identified a category of the provider, may be determine content required and/or otherwise germane for a platform tailored to the provider category. Such content could be based on a category-specific platform template. Such content could be based on selections made during a provider analysis process and/or a platform definition process, as discussed herein. The system may determine whether sufficient content is already retained by the system. In satisfactory content is needed, content may be requested from the provider, as indicated by block 808. The system may prompt the provider for missing and helpful/required content. As indicated by block 810, a content may be received responsive to the request. The system may process the content and determine whether is the content satisfies the request. The result of such determination may be indicated to the provider. In some embodiments, as indicated by block 812, content may be translated as needed. Content can be received in multiple different formats (e.g., sizes, file types, content types, etc.) and converted to platform requirements. As indicated by block 814, content may be retained in specified format for presentation with the platform.

Figure 9:
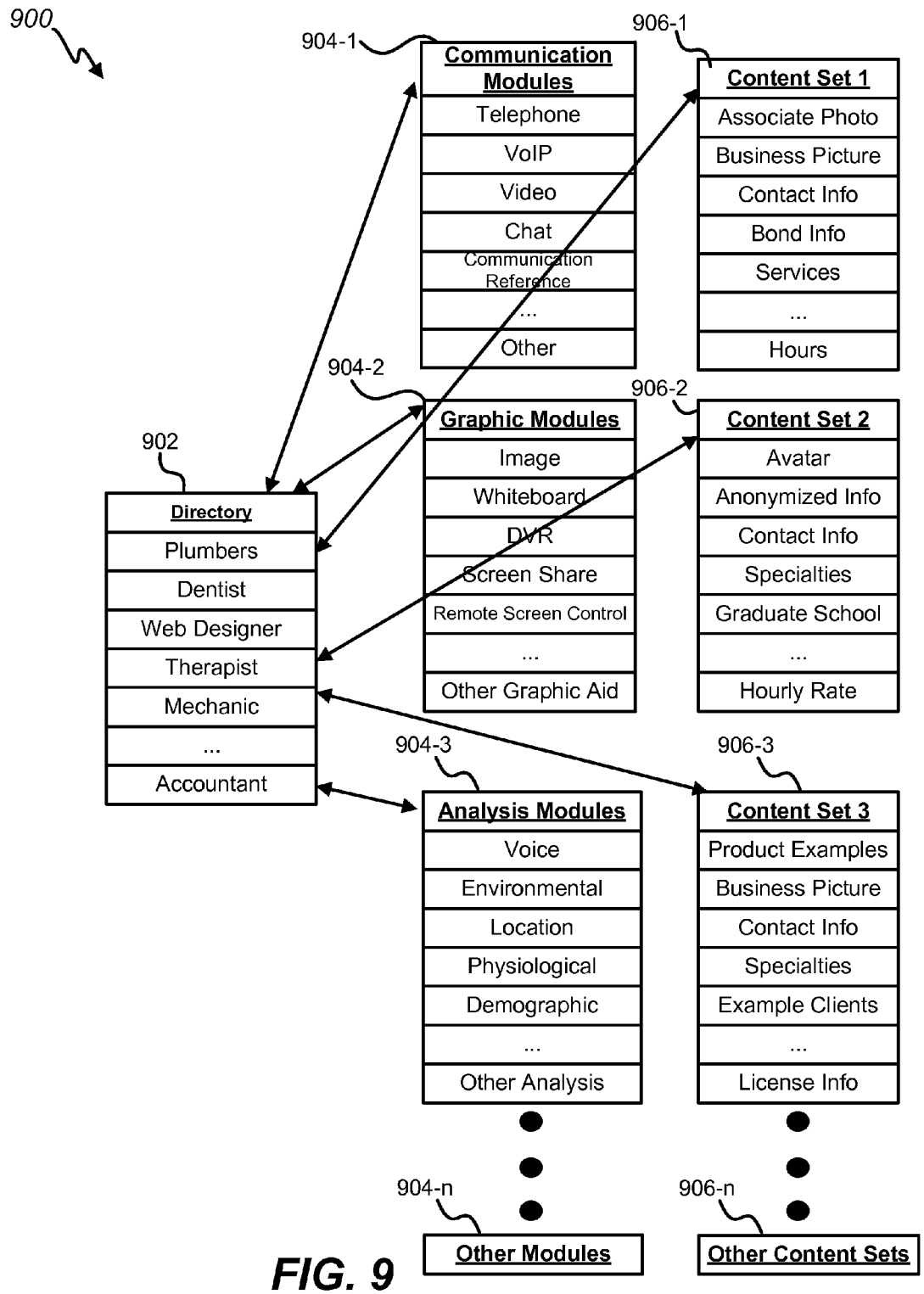
FIG. 9 illustrates a diagram of illustrative associations of provider categories, service modules, and content, in accordance with certain embodiments of the present disclosure.

FIG. 9 illustrates a diagram 900 of illustrative associations of provider categories, service modules, and content, in accordance with certain embodiments of the present disclosure. Depicted are certain non-limiting examples out of many suitable possibilities. In some embodiments, each category from a directory 902 (i.e., a set of provider categories) can be associated with a set of certain modules 904. The categories depicted are merely illustrative. Any suitable category scheme, which may include any suitable breadth of categories (i.e., range of provider types) and any suitable depth of sub-categories (i.e., granularity of categorization), may be employed. In some embodiments, the system may match a provider to a category with which the provider and category share common attributes (e.g., a tax service can be associated with an accountants category).

Platform templates may link certain categories 902 with sets of certain modules 904. With one or more categories pertinent to a provider based on category and association information retained in the one or more repositories, category-specific templates may include information about appropriate communication options for the category. For example, such category information for a plumber may indicate that basic communication options 904-1 are appropriate, such as voice, perhaps in conjunction with video and/or messaging. Category information for other types of providers may indicate the need for more advanced options 904, which may correspond to communication 904-1, graphic 904-2, analysis 904-3, and/or other modules 904-n. For example, it may be appropriate for a therapist to have not only video conferencing, but also higher resolution video capabilities (e.g., to allow for more sensitive expression analysis), biofeedback capabilities, and/or the like.

Platform templates may link certain categories 902 with sets of certain content sets 906. Category-specific templates may include information about appropriate content options for the category. For example, anonymized information may be appropriate for certain therapist categories, real photos of a professional may be appropriate for certain categories (say, an orthodontist), avatars may be appropriate for other categories, etc. In another example, a business representative may provide the system uniquely identifying information of a business name "Joy of Teeth," an address "123 North Street, San Francisco, Calif. 94103," and a product summary of "preventative service and maintenance of human teeth." According to certain embodiments, using the uniquely identifying information, the system can match the business to a category of dentist, and the system can then retrieve a template associated with the category of dentist, which template specifies a set of recommended modules and a set of content to request from the business representative.

Figure 10:
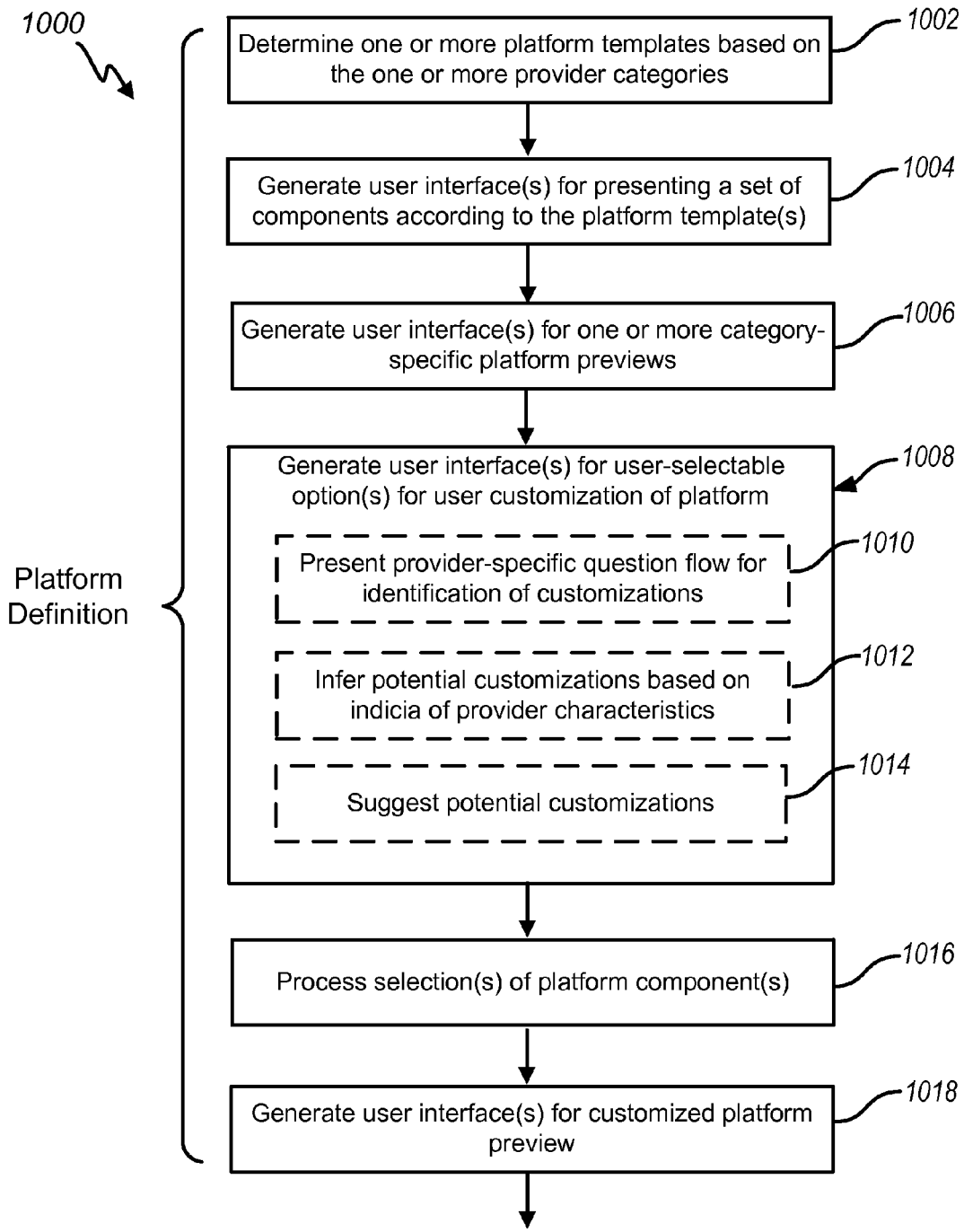
FIG. 10 illustrates an example method of platform definition, in accordance with certain embodiments of the present disclosure.

FIG. 10 illustrates an example method 1000 of platform definition, in accordance with certain embodiments of the present disclosure. As indicated by block 1002, one or more platform templates based on the one or more provider categories may be determined. As indicated by block 1004, one or more user interfaces for presenting information about a set of components according to the platform template(s) may be generated. Aspects of a selected platform template may be indicated to a provider in any suitable fashion. As indicated by block 1006, one or more user interfaces for category-specific platform previews may be generated. Accordingly, the provider may be allowed to preview the platform that the system has determined as appropriate for the provider.

However, the category-specific platform based on a particular template may be customizable in some embodiments. As indicated by block 1008, one or more user interfaces for user-selectable option(s) for user customization of a platform may be generated. For example, options to select and/or deselect certain platform features may be provided to allow the provider to easily customize the platform. In some embodiments, as indicated by block 1010, a provider-specific question flow for identification of customizations may be presented to facilitate the customization. Potential customizations could be identified as optional for specific categories, for example, and the question flow could follow a decision tree to identify the most appropriate options for the provider. In some embodiments, as indicated by block 1012, potential customizations may be inferred based on indicia of provider characteristics as in various embodiments discussed herein. In some embodiments, as indicated by block 1014, one or more potential customizations may be suggested. For example, optional customizations could be suggested for specific categories.

As indicated by block 1016, one or more selections of platform components may be processed, the provider having chosen certain customizations. As indicated by block 1018, one or more user interfaces for preview of a customized platform may be generated. The provider may have the options to accept the current configuration for the customized platform or to continue the customization process.

Figure 11:
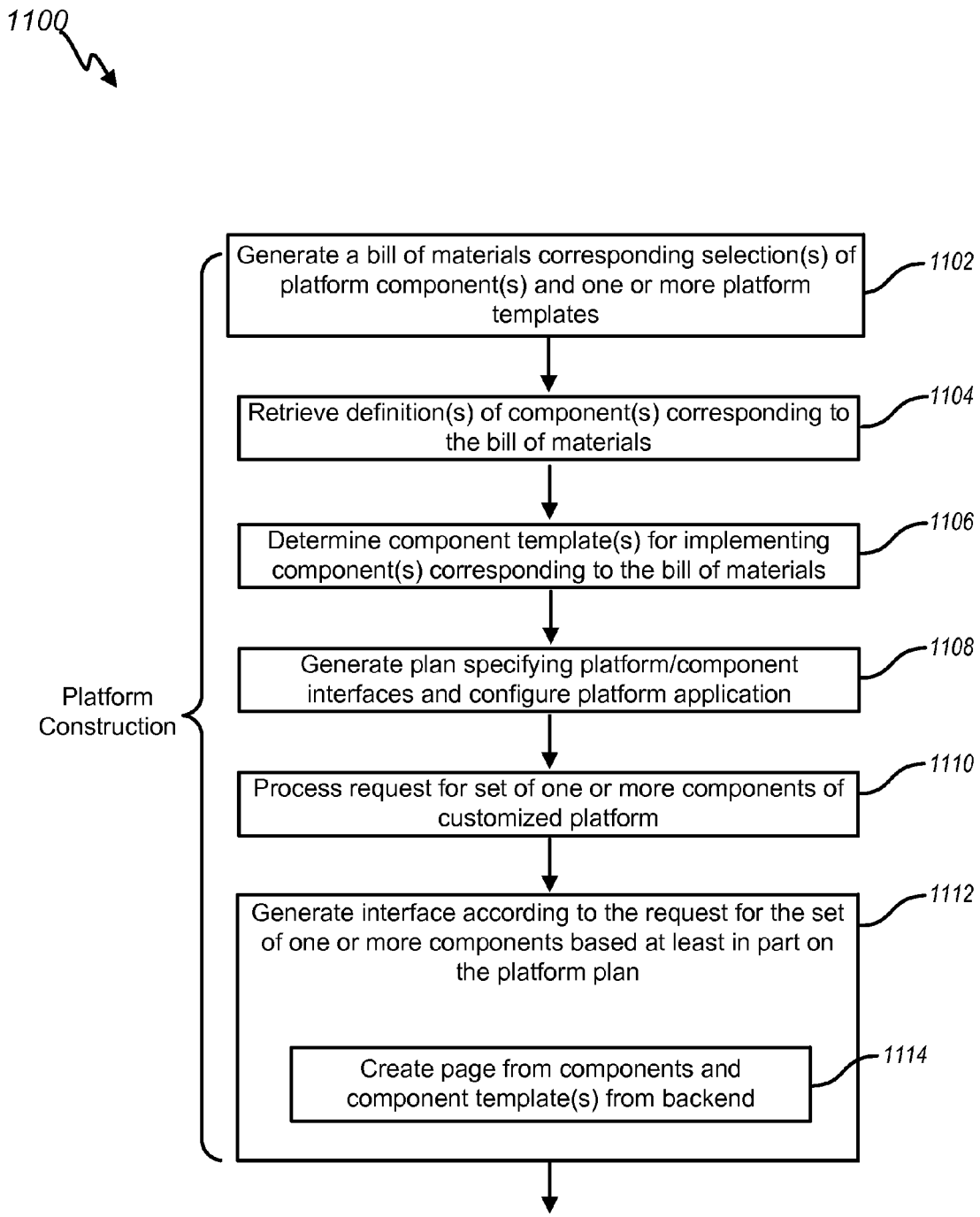
FIG. 11 illustrates an example method of platform construction, in accordance with certain embodiments of the present disclosure.

FIG. 11 illustrates an example method 1100 of platform construction, in accordance with certain embodiments of the present disclosure. In some embodiments, as indicated by block 1102, a bill of materials corresponding to platform components for the selected platform may be generated. In some cases, the selected platform and components may be specified by one or more platform templates. In some cases, the selected platform and components may correspond to provider selections and customizations, which may be customizations of component sets initially specified by a template.

The platform components may include any one or combination of modules, objects, content, resources, component interfaces such as glue code, translation profiles with associated translation, linking code, etc., and/or the like. As indicated by block 1104, one or more definitions of platform components may be retrieved by the system, the component definitions having been predetermined and retained for platform adaptation. Retrieval of definitions of platform components could be based on the bill of materials.

As indicated by block 1106, one or more component templates for implementing one or more components may be determined. The component templates could specify interface profiles for integrating the components with the platform application. For example, glue code could be used to graft the modules into the application. The component templates could specify interface profiles for retrieving, translating, and/or inserting components (such as content, descriptions, options, etc.) into allocated spaces.

As indicated by block 1108, a plan specifying the platform and component interfaces may be generated, and the platform application may be configured according to the plan. The plan may map components and resources for the platform implementation. Processing resources and database resources may be allocated to the platform and specified by the plan. Resource requirements may be predetermined on a component basis, and the compilation of components for a particular platform may be assessed to determined the total resource allocation required for the implementation. The plan may include a definition of the platform as a whole, including the elements necessary, including metadata, for the software services to provide platform features. An object creation module may be used to automatically create objects to provision particular components. As indicated by block 1110, a request for a set of one or more components of the platform may be processed, the request coming from, say, the provider or a consumer. As indicated by block 1112, an interface according to the request for the set of one or more components may be generated. An application constructor may be configured for obtaining components as necessary and constructing an interface. As indicated by block 1114, one or more pages may be created based on components and component template(s) retrieved and loaded from the backend system for use.

Figure 12:
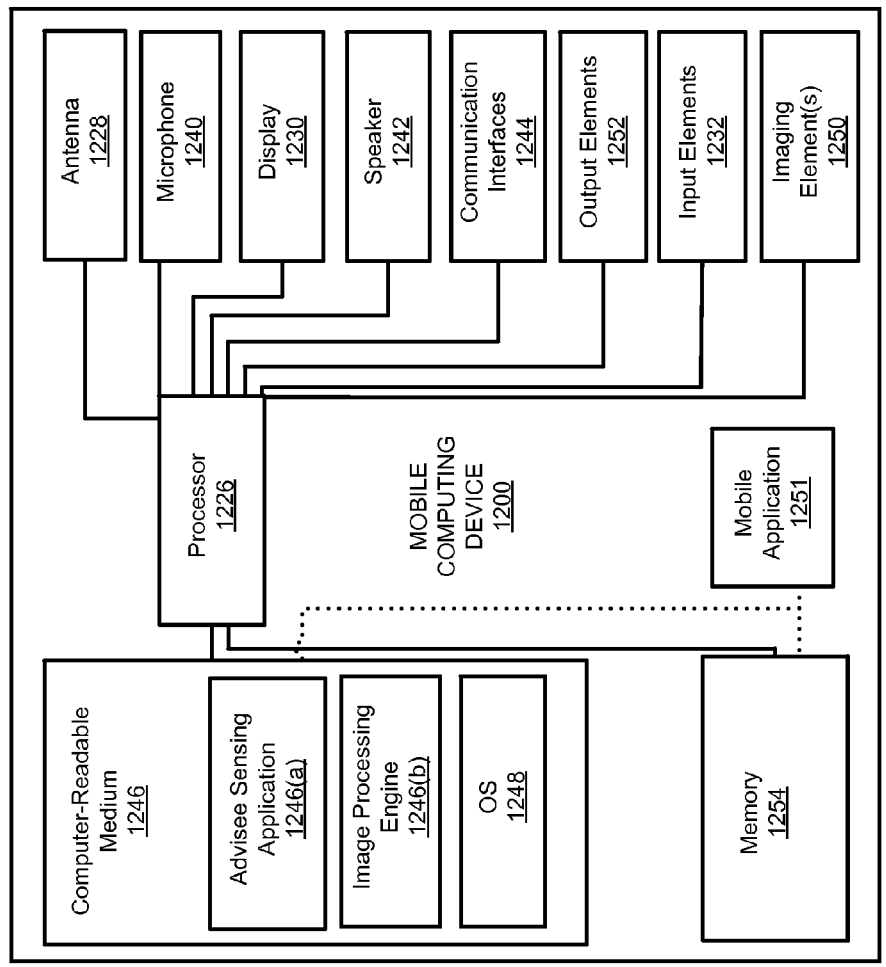
FIG. 12 shows a functional block diagram of a computing device, in accordance with certain embodiments of the present disclosure.

FIG. 12 is a functional block diagram of a computing device 1200, which may correspond to one or more of interfaces 102 and/or 112, according to certain embodiments of the present disclosure. In some embodiments, the computing device 1200 may be mobile computing device. In some embodiments, the computing device 1200 may be provided with a mobile application 1251 configured to run on the computing device 1200 to facilitate various embodiments of this disclosure. The computing device 1200 may be any portable device suitable for sending and receiving information over a network in accordance with embodiments described herein. For example without limitation, in various embodiments, the computing device 1200 may include one or more variously referenced as a mobile phone, a cellular telephone, a smartphone, a handheld mobile device, a tablet computer, a web pad, a personal digital assistant (PDA), a notebook computer, a handheld computer, a laptop computer, a vehicle computer, or the like.

As shown in FIG. 12, the computing device 1200 includes a display 1230 and input elements 1232 to allow a user to input information into the computing device 1200. By way of example without limitation, the input elements 1232 may include one or more of a keypad, a trackball, a touchscreen, a touchpad, a pointing device, a microphone, a voice recognition device, or any other appropriate mechanism for the user to provide input. The display 1230 may include a resistive or capacitive screen. The display 1230 may be configured for stylus sensitivity which allows detection of movement of the stylus on the screen. The touch-screen capability may be achieved via an electronic position location system capable of determining a location of a selected region of the display screen. A commercially available electronic position location system like the ones that are used in many commercially available devices such as personal digital assistants, tablet PCs, and smartphones, may be used. An exemplary system may comprise a glass or plastic plate with a metallic coating facing a metallic coating on an underside of a layer of Mylar™ above the glass or plastic plate. Pressing the screen with the stylus brings the plate and the Mylar™ layer in contact with each other so that an electrical current flows through them. By measuring the electrical current from two sides of the display screen, a computer program then determines the vertical and horizontal position of the stylus. By sampling contact locations at a predetermined rate, such as, 100 times a second or faster, the display screen can detect the position of the stylus. In other examples, there can be a grid of wires under the display screen that can be activated after interaction with the stylus. The x-y position can be determined with a processor inside the apparatus.

The input elements 1232 may include one or more of: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like. The input elements 1232 may include a set of one or more of the following physiological sensors: bioimpedance, respiration, respiration rate variability, heart rate (average, minimum, maximum), heart rhythm, heart rate variability, respiratory sounds, blood pressure, activity, posture, and/or temperature/heat flux. The input elements 1232 may include an activity sensor that may be one or more of the following: ball switch, accelerometer, heart rate, bioimpedance noise, skin temperature/heat flux, blood pressure, muscle noise, posture. In some embodiments, heart rate or other physiological aspects may be detected in conjunction with the flash of the camera. For example, a consumer could place his finger over the flash so that heart rate may be detected.

The computing device 1200 includes a memory 1254 communicatively coupled to a processor 1226 (e.g., a microprocessor) for processing the functions of the computing device 1200. The computing device 1200 may include at least one antenna 1238 for wireless data transfer.

The computing device 1200 may also include a microphone 1240 to allow a user to transmit voice communication through the computing device 1200, and a speaker 1242 to allow the user to hear voice communication, music, etc. In addition, the computing device 1200 may include one or more interfaces in addition to the antenna 1238, e.g., a wireless interface coupled to an antenna. The communications interfaces 1244 can provide a near field communication interface (e.g., contactless interface, Bluetooth, optical interface, etc.) and/or wireless communications interfaces capable of communicating through a cellular network, such as GSM, or through Wi-Fi, such as with a wireless local area network (WLAN). Accordingly, the computing device 1200 may be capable of transmitting and receiving information wirelessly through both short range, radio frequency (RF) and cellular and Wi-Fi connections.

Additionally, the computing device 1200 can be capable of communicating with a Global Positioning System (GPS) in order to determine a location of the computing device 1200. In the embodiment shown in FIG. 12, the antenna 1238 may include a cellular antenna (e.g., for sending and receiving cellular voice and data communication, such as through a network such as a 12G or 4G network), and interfaces 1244 may include one or more local communication interfaces. The antenna 1238 may include GPS receiver functionality. In other embodiments contemplated herein, communication with the computing device 1200 may be conducted with a single antenna configured for multiple purposes (e.g., cellular, transactions, GPS, etc.), or with further interfaces (e.g., three, four, or more separate interfaces).

The computing device 1200 can also include at least one computer-readable medium 1246 coupled to the processor 1226, which stores application programs and other computer code instructions for operating the device, such as an operating system (OS) 1248. The mobile application 1251 may be stored in the memory 1254 and/or computer-readable media 1246. The computer-readable medium 1246 can include a sensing application to gather and/or process any suitable information regarding the consumer in accordance with various embodiments, including, for example, data gathered from sensors of the computing device 1200. In certain embodiments, the sensing application 1246(*a*) can automatically run each time that a user accesses the mobile application 1251. In some embodiments, the sensing application 1246(*a*) can run continuously (e.g., in the background) or at other times, such as when the mobile application 1251 is initiated by a user. With some embodiments, the sensing application 1246(*a*) is separate from the mobile application 1251. In other embodiments, the mobile application 1251 may include the sensing application 1246(*a*). In some embodiments, the mobile application 1251 and/or the sensing application 1246(*a*) can include a customizable user interface (UI), which can be determined by the user's preferences through application-level programming.

The computer-readable medium 1246 can also include an image-processing engine 1246(*b*). The image-processing engine 1246(*b*) can capture an image and compress the image in a format readable by a central processing server.

The computing device 1200 can additionally include one or more imaging elements 1250, such as an integrated camera, capable of capturing images and/or video, and output elements 1252. In certain embodiments, the computing device 1200 may include a non-transitory computer-readable storage medium, e.g., memory 1254, for storing images captured with the one or more imaging elements 1250. In alternative embodiments, the computing device 1200 receives image data from an image capture device that is not integrated with the computing device 1200 and stores those images on the aforementioned non-transitory storage medium.

In some embodiments, image information is captured using at least one imaging element computing device. In some embodiments, the image information includes image information for at least a portion of a user of the computing device. The image information in some embodiments includes a brightness level of an area around the electronic device. In some embodiments, the image information may include video and/or still images. The one or more imaging elements 1250 may include one or more IR sensors, cameras, iris detectors, heat sensors, ambient light sensor, or other image capturing technology for capturing the image information. In some embodiments, computing device 1200 may use one or a combination of different imaging elements to capture the image information. Some embodiments may capture the image information continuously or periodically (e.g., every few seconds).

The display screen of some embodiments displays information to the viewer facing the display screen (e.g., on the same side of the computing device as the display screen). The computing device in this example can include one or more imaging elements, in this example including image capture elements on the front of the device and image capture elements on the back of the device. It should be understood, however, that image capture elements could also, or alternatively, be placed on the sides or corners of the device, and that there can be any appropriate number of capture elements of similar or different types. The imaging elements also can be of similar or different types.

In some embodiments, one or more IR detectors may be able to capture the infrared radiation that is reflected back from a surface, such as a viewer's retinas, in a direction that is substantially orthogonal and/or at other angles to the capture plane of the detector. In some embodiments, a computing device may utilize one or more IR emitters (e.g., IR light emitting diodes (LEDs), IR laser diodes, or other such components), to illuminate a consumer's face, with the reflected light being captured by a IR sensor.

In some embodiments, the platform may include a graphical user interface, and may display images that may include one or more selectable items included in the graphical user interface. An input device may be movable in free space and may be configured to point to the selectable items. In some examples, an input device such as a stylus, a pen, finger contact, etc. may be used to write or mark-up the image, by for example making notations, or sketching, or the like on the displayed image. In some embodiments, the platform may provide a graphical user interface with a whiteboard feature, allowing a service provider and/or consumer to write or draw on the whiteboard.

Figure 13:
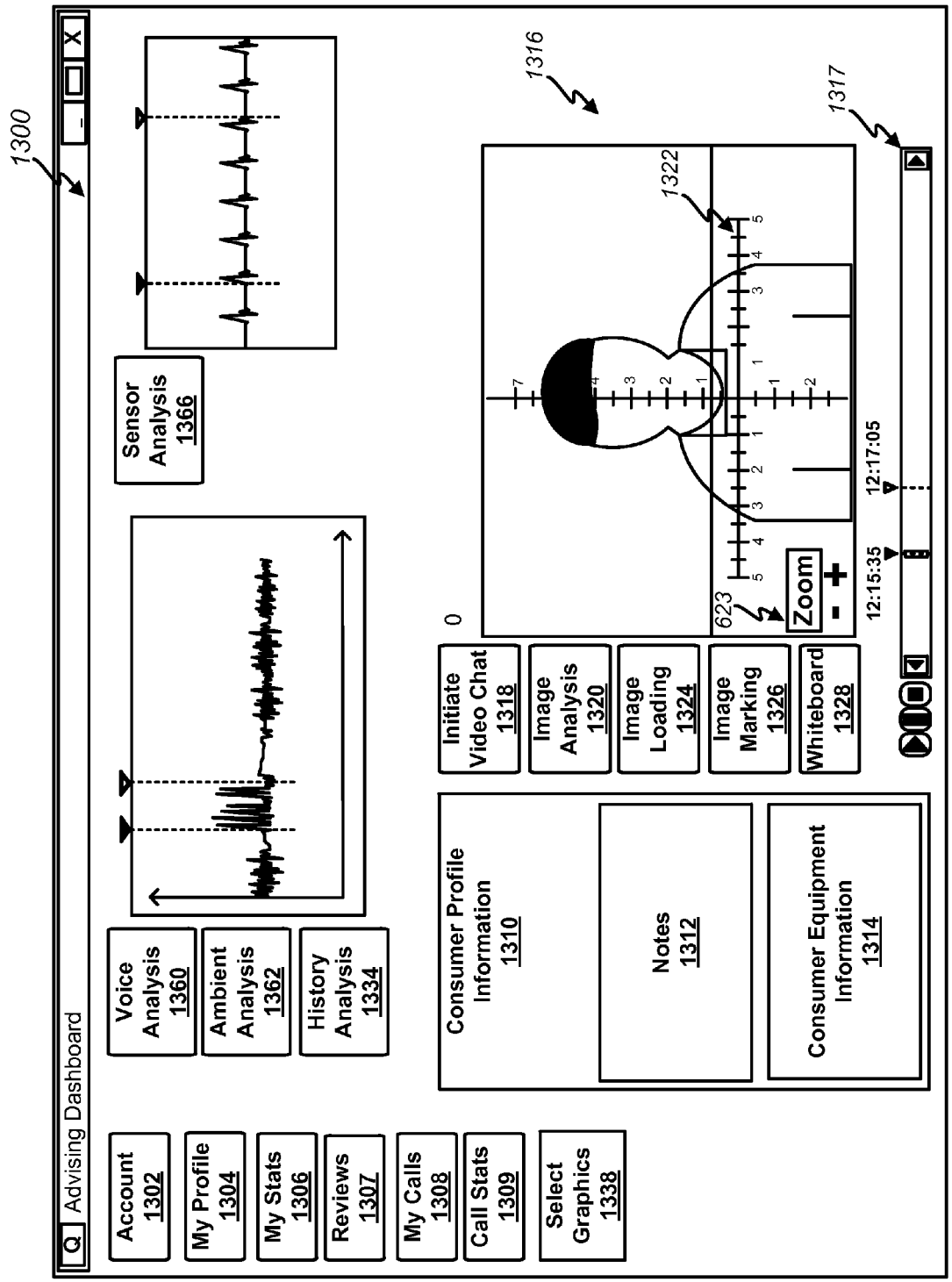
FIG. 13 illustrates one embodiment of a service provider interface for a platform that may be configured with the platform shape shifter, in accordance with certain embodiments of the present disclosure.

FIG. 13 illustrates one embodiment of a service provider interface for a platform that may be configured with the platform shape shifter, in accordance with certain embodiments of the present disclosure. Certain embodiments may provide for tracking of information regarding consumers. Tracked information could include information relating to equipment that a consumer uses and has used to interface with one or more service providers. For example, information about the specific devices, device configurations, and/or device capabilities that a give consumer uses could be tracked and retained in a repository. Such tracked information for a particular consumer could be made available to a service provider before, during, and/or after an assistance session for the consumer. In some embodiments, such consumer-related information could be provided by the consumer, the service provider, and/or via automatic detection by the system. For each consumer, a dossier could be compiled and made available to a service provider to facilitate assistance the consumer.

In various embodiments, a service provider platform may track calls, messages, billing, etc. and enable service providers to interact with the platform to retrieve, see, and use the data. A feed of information and/or a dashboard could be in a web portal and/or provided via a mobile application. The service provider could customize the dashboard and/or the feeds. In some embodiment, for example, the service provider can supply default templates and include portions of the templates that can be ignored.

Certain embodiments may provide for consumer history analysis. Certain embodiments may provide a consumer history engine that manages, collects, retrieves, updates, and/or retains information relevant to a particular consumer. Certain embodiments may automatically identify a caller, correlate the caller to a consumer profile, and provide consumer profile information to the service provider to enrich the assistance session by making consumer profile information available to the service provider. Consumer profile information may provide the service provider with valuable context.

Certain embodiments may allow a service provider to record consumer information in a repository for later reference. Such provision of historical information particular to a consumer may allow the service provider to provide information appropriate for the consumer's specific needs. Certain embodiments may provide system features that automatically analyze and present historical information for a consumer, for example, via the service provider dashboard. The analysis of the information may include comparison of current information to past information for the consumer.

Certain embodiments may provide for consumer equipment configuration analysis. The particular information available to and service provider may depend on the capabilities and configuration of the media used. In some embodiments, the platform may retrieve and/or identify information about the capabilities of the consumer's computing device and/or communication medium, assess the capabilities against various analytical possibilities of a given service provider, and present capability information to the service provider.

In certain aspects, the service provider interface for the advising platform may include a dashboard 1300. For example, after a service provider logs into the platform, different data points that can be of use for the service provider may be presented to the service provider to facilitate advising. The dashboard 1300 may include any software process or module operable to present and receive information to/from a service provider 113, allow a service provider to monitor consumer information, select different types of consumer-related data, identify desired metrics, automatically generate dashboard views, customize dashboard views, and/or the like. The example of the dashboard 1300 is not limiting. In some embodiments, a dashboard 1300 may correspond to a mobile application interface.

In some embodiments, the dashboard 1300 may correspond to a page of the platform and/or an app that a service provider might see upon being connected with a consumer. The dashboard 1300 may provide a graphical user interface (GUI) that includes any number and type of user-selectable options to facilitate various embodiments. In various embodiments, one or more user-selectable options may include one or more of a screen-labeled function key, an icon, a button, a soft button, a window, a menu, a control widget, a scroll bar, a slider, a listbox, and/or the like. In various embodiments, one or more user-selectable options may be selectable via one or more of touch, push, movement-based selection, and/or any suitable navigation feature.

In various embodiments the user-selectable options may include one or more of an account feature 1302, a service provider profile management feature 1304, a service provider statistics feature 1306, a call management feature 1308, and/or the like. The service provider page may allow for a high-level presentation of features that allow for accessing more specific features. In various embodiments, any one of the features of the dashboard 1300 may include automatically presented information. Information of interest may be automatically presented to the service provider.

In some embodiments, the platform information handling system 106 may include one or more account management modules. The account management module may be configured to allow a service provider to manage the service provider's account. Management options may be provided for the service provider to make changes to the account, contact customer service, change/update the service provider's profile, change/update the service provider's preferences, create/change/update the service provider's advertisements, select various advertising products, management call-back settings, manage alert settings, and/or the like.

A service provider account management module may include logic to retrieve, process, derive, compile, aggregate, handle, store, report, and/or present information about items of interest associated with service provider accounts. For example, items of interest could include activities associated with a service provider account. Items of interest could include whether a service provider is missing calls from consumers and other information associated with the missed calls, such as details surrounding the missed (e.g., number of calls, times of calls, numbers called, caller information, location information, and/or the like). Items of interest could include any billing information associated with the account. Items of interest could include any messages/calls associated with the account, such as messages from customer service, from consumer, and/or the like.

In some embodiments, a ratings/reviews feature 1307 may be configured to present access to details regarding ratings and/or reviews associated with a service provider's services. The ratings and/or reviews may correspond to consumer feedback per surveys and/or any suitable feedback gathering tool.

In some embodiments, a call statistics feature 1309 may be configured to present access to details regarding any of the service provider's calls. In some embodiments, for example, access to details about a call and/or a particular customer can be provided in a variety of ways. In some embodiments, for example, access can be provided to details about a call by a particular consumer, calls per particular location, calls using a particular number, calls of interest which may be based on any suitable additional information, such as intelligence about a particular caller of interest, a particular location of interest, etc., calls that were successfully connected, missed calls, dropped calls/calls receiving a busy tone, call-back statistics, call lengths, and/or the like. For instance, the call of interest feature could identify a number of calls from a particular caller in a particular time period as an indication of interest. As another example, the call-back statistics features could indicate a service provider's average time to call a consumer back.

In some embodiments, consumer profile information 1310 may be presented. Certain embodiments may automatically identify a caller, correlate the caller to a consumer profile, and provide consumer profile information 1310 to the service provider to enrich the advising session. The consumer profile information 1310 may provide the service provider with valuable context. The consumer profile information 1310 may include information about a particular consumer, such as information relating to consumer location, biographical data, health conditions, life conditions, problems, advice provided, etc. The consumer profile information 1310 may include tracked information and retained information pursuant to one or more previous advising sessions. In some embodiments, such consumer-related information could be provided by the consumer, the service provider, and/or via automatic detection by the system. Certain embodiments may provide for a consumer history engine that manages, collects, retrieves, updates, and/or retains information relevant to a particular consumer. For example, such tracked information may include information about a consumer's facial expressions, which may include micro-expressions, voice, speaking, body language, gestures, emotional indicia, writing, environmental context, and/or the like. Such tracked information for a particular consumer could be made available to a service provider before, during, and/or after an advising session for the consumer. Accordingly, for each consumer, a dossier could be compiled and made available to a service provider to facilitate advising the consumer.

The service provider may have the ability to annotate 1312 the consumer profile according to the service provider's judgment and such information may be retained and for subsequent reference and comparison. The service provider may record consumer information for later reference. Such provision of historical information particular to a consumer may allow the service provider to provide information appropriate for the consumer's specific needs.

In some embodiments, information relating to equipment 1314 that a consumer uses and/or has used to interface with one or more service providers may be presented. For example, information about one or several specific devices, device configurations, and/or device capabilities that a given consumer uses could be detected and/or tracked, and presented to the service provider so that the service provider is aware of the capabilities on the consumer side. The particular information available to a service provider may depend on the capabilities and configuration of the media used. In some embodiments, the platform may retrieve and/or identify information relating to the capabilities of the consumer's computing device and/or communication medium, compare the capabilities against various analytical possibilities of a given service provider, and present capability information to the service provider. For example, a computing device with a voice over IP capabilities may enable analysis of voice and speaking. For example, based on the consumer's configuration information, it may or may not be possible for certain aspects of the consumer's facial expressions, which may include micro-expressions, voice, speaking, body language, gestures, emotional indicia, writing, environmental context, etc. to be analyzed. For example, the resolution of the camera on the consumer's computing device may limit the extent to which certain image-based aspects may be analyzed. In some embodiments, for example, an analysis of the consumer's iris may require a minimum threshold of resolution for effective analysis. The consumer's computing device may or may not have writing capabilities to allow for the consumer's writing to be readily analyzed. For example, the consumer's computing device may allow the consumer to write on the device screen with a finger, stylus, or other tool of the consumer.

In some embodiments, a video interface 1316 may be provided. The video interface 1316 may provide for one- or two-way video communication between service provider and consumer. In some embodiments, a video chat session could be established between service provider and consumer. An option to initiate a video chat session 1318 could be presented. In some embodiments, the video interface 1316 may include navigation features 1317. Video content could be buffered and/or recorded to facilitate navigation and advising. The navigation features 1317 could include options to pause, play, stop, fast-forward, rewind, skip forward, skip backward, skip to certain times, and/or the like. The options could include a selectable navigation bar. In some embodiments, the video interface 1316 may allow for saving of video for further reference and/or analysis. In some embodiments, the video interface 1316 may allow for retrieving and replay of previous video content, e.g., from a previous video session. This may allow for enhanced advising.

In some embodiments, image analysis features 1320 may be provided. In some embodiments, a service provider and/or the platform information handling system 106 may utilize face, biometric and/or like recognition/analysis (e.g., using pattern classification techniques) to determine characteristics of the consumer. Certain embodiments may provide for parsing techniques that identify and measure movements and/or various physical aspects of the imagery. For example, movements and/or various physical aspects of the consumer's face, eyes, and/or the like may be identified and measured. Physical aspects could be correlated to the geometrical shapes, recorded, and compared to reference information—including, for example, previous information for the same subject and/or other reference information.

Captured image information may be analyzed to determine a state and/or a characteristic of a consumer. In some embodiments, image information may include a portion of the consumer user, such as the user's face, eyes, hands, chest, etc. By analyzing the captured image information, the service provider and/or the system may determine the state and/or a characteristic. Image information may be analyzed to determine whether there is a change in the service provider's states. In some embodiments, any one or combination of triggers may be detected (e.g., rapid change in eye movement and/or facial movement). Upon detecting the trigger(s), the service provider and/or the system may determine various characteristics. In one example, information of the user's chest may be analyzed to determine that the consumer's breathing rate has slowed down beyond a threshold value or increased beyond a threshold value, indicating various states/responses of stress, agitation, emotion, anxiety, excitement, etc. In another example, captured information of the consumer's blood vessel(s)/veins may be analyzed to determine that the consumer's heart rate has sped up or slowed down, indicating various states/responses of stress, agitation, emotion, anxiety, excitement, etc. Some embodiments may also analyze information of the consumer's eyes (e.g., eyelids, pupils) to determine various indicia of states/responses.

In some embodiments, reference indicia 1322, such as cross-hairs and/or target aperture, so that the service provider may focus the video with zoom features 1323 on various aspects of the subject imagery provided by the consumer, such as the consumer's face or other physical aspects. For example, the service provider may wish to closely examine any suitable physical feature of the consumer to facilitate the advising session. A service provider in the area of iridology, for instance, may wish to closely focus on the iris of the subject in order to analyze and/or explain aspects based on thereon. In some embodiments, reference indicia 1322 may allow for selection of certain aspects of imagery for focused image analysis of those aspects by the system.

In some embodiments, image loading features 1324 may be provided to view, upload, download, or otherwise handle still images. An image viewing and/or editing could be provided in addition to or in alternative to the view interface 1316. In some embodiments, image editing/marking features 1326 may be provided. One or more selectable items included in the graphical user interface to allow writing and/or marking the image, by for example making notations, or sketching, or the like on the displayed image. In some embodiments, the platform may provide a graphical user interface with a whiteboard feature 1328. The whiteboard feature 1328 can allow a service provider and/or consumer to write or draw on a whiteboard that could be provided in addition to, or in alternative to the view interface 1316.

In some embodiments, voice analysis features 1330 may be configured for voice and/or language analysis of voice input provided by the consumer. As previously noted, certain embodiments may provide for detecting and characterizing a consumer's voice. Spectral analysis techniques may be applied to indicate, for example, a consumer's emotional state. The platform could analyze the consumer's voice and present certain analysis results to the service provider, for example, with graphics. For example, such information may be presented to the service provider via a service provider dashboard. Any suitable voice analysis technique may be employed. In some embodiments, various alternative and well-established analysis techniques may be presented as options to the service provider such that the service provider may choose one or more of the techniques to be employed for a particular consumer. In some embodiments, an analysis for a consumer may be compared to data retained from one or more past advising sessions for the consumer. The detected voice data may be assigned a score and compared to reference information for the consumer and/or other reference information.

In some embodiments, environmental analysis features 1332 may be provided for detecting and characterizing a consumer's environment. As previously noted, in some embodiments, an environmental analysis for a consumer may be compared to data retained from one or more past advising sessions for the consumer. A normal environmental state may be identified for a consumer. Changes with the respect to the normal state may be identified and presented to the service provider, for example, via the dashboard. Environmental information may be detected through the media used. For example, background noise may be detected and measured and/or characterized during a phone call or video session. The background noise may be assigned a score and compared to reference information for the consumer and/or other reference information. Environmental information may be more specifically identified. For example, noise from a TV, other people, traffic, sirens, trains, pets, etc. may be more particularly identified. The service provider may have the ability to annotate the consumer profile according to the service provider's judgment and such information may be retained and for subsequent reference and comparison.

In some embodiments, consumer history analysis features 1334 may be provided for analyzing and presenting any suitable historical information. The analysis of the information may include comparison of current information to past information for the consumer. Past information may be graphically compared with current information via the dashboard 1300.

The system may include a threshold detection component may analyze any consumer related information (voice, movements, or any sensed input, for example) in reference to any suitable threshold. When a threshold has been met or exceeded, a notification may be presented to service provider via the dashboard. The threshold may be predetermined and/or customizable by the service provider. The threshold may be set by the system as a default. The threshold may be based on system analysis of past information for the consumer. For example, past voice analysis may indicate certain norms, averages, ranges, and/or other characteristics of an individual consumer's voice pattern. One or more thresholds may be based on such past characteristics. For example, an input signal amplitude exceeding or falling below a threshold for an amount of time may be flagged. Thus, when a consumer exhibits uncharacteristic voice aspects that exceeded the one or more thresholds, a notification may be graphically indicated to service provider via the dashboard.

In some embodiments, sensor analysis features 1336 may be provided. The sensor analysis features 1336 may be based on input elements that include one or more of the following physiological sensors: bioimpedance, respiration, respiration rate variability, heart rate (average, minimum, maximum), heart rhythm, heart rate variability, respiratory sounds, blood pressure, activity, posture, and/or temperature/heat flux. The input elements 232 may include an activity sensor that may be one or more of the following: ball switch, accelerometer, heart rate, bioimpedance noise, skin temperature/heat flux, blood pressure, muscle noise, posture. In some embodiments, heart rate or other physiological aspects may be detected in conjunction with the flash of the camera. For example, a consumer could place his finger over the flash so that heart rate may be detected.

A graphic selection feature 1338 may be configured to present access to details of advising information and/or any suitable data according to various embodiments herein in any suitable format with any suitable graphics. By way of non-limiting example, pie charts, bar graphs, line graphs, tables, with features allowing ordering and/or filtering of data according to any suitable criteria, matrices, Venn diagrams, images, photos, and/or the like may be implemented according to various embodiments. In some embodiments, the graphic selection feature 1338 may allow for service provider customization and/or manipulations of graphics presented with the dashboard 1300.

It is to be understood that the depicted dashboard 1300 is for example purposes only. Accordingly, the dashboard 1300 may provide a GUI that may include or present data for a service provider interface of an advising platform in any suitable format with any suitable layout of any suitable sets/subsets of features, along with any desired graphical depiction of information, to facilitate features of various embodiments of the present disclosure.

The platform information handling system 106 may include one or more logging modules. The logging module(s) may be configured to perform logging processes to receive and log data of interest for advising sessions. A consumer analytics module(s) may include logic configured to retrieve, process, derive, compile, aggregate, handle, store, report, and/or present information relating to data associated with consumers. The consumer analytics module may be configured to present any desirable information in any desirable manner. With respect to a particular service provider, the logging module and analytics module may facilitate various features of a service provider interface for an advising platform, in accordance with certain embodiments herein.

The logging module may include tracking logic to track calls, in accordance with certain embodiments. In some embodiments, the logging module may be configured to identify whether a caller is successfully connected with a service provider, whether the call is missed, whether the call is dropped/disconnected/receives a busy tone, whether the call is routed to voicemail, and/or whether a voicemail is left. In some embodiments, the logging module may include ANI logic to identify numbers of callers. In some embodiments, the logging module may be configured to track the length of calls. In some embodiments, the logging module may be configured to record calls.

In some embodiments, the consumer analytics module may be configured to present comparative data. For example, current consumer data may be compared to past consumer data. Any type of consumer data may be compared. A service provider may have user selectable options to select different types of statistics for comparison and order by different types of statistics.

Figure 14:
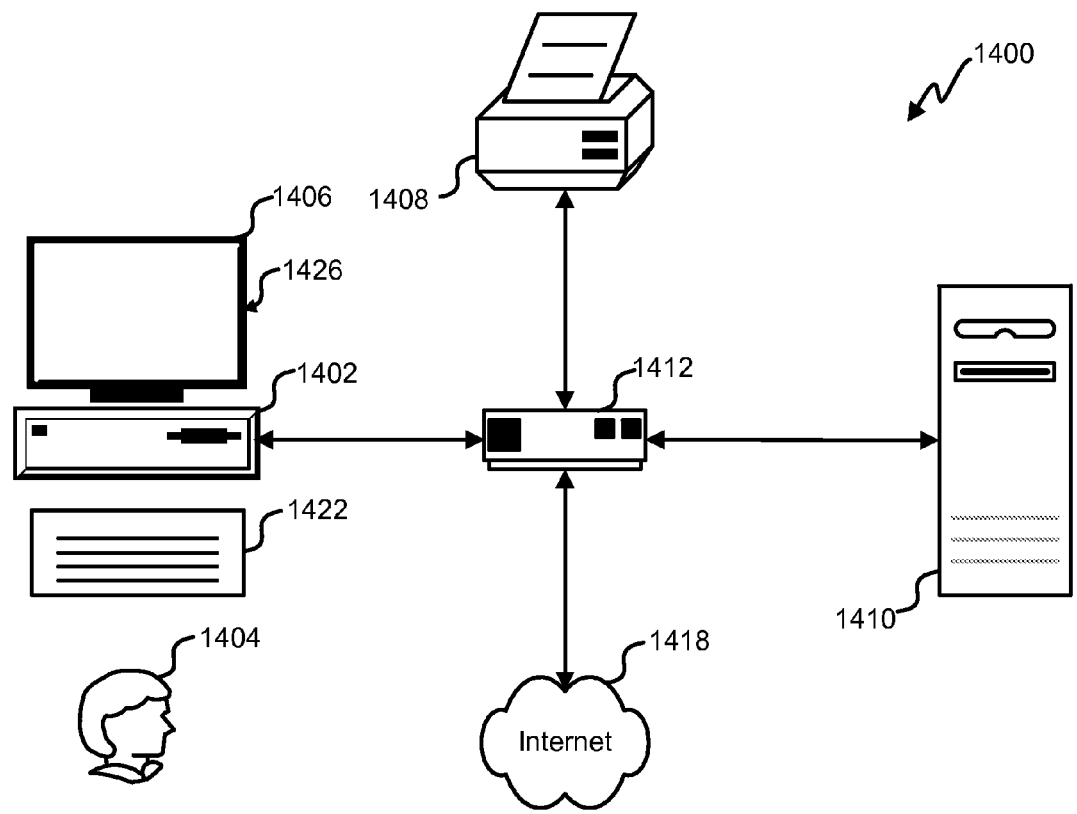
FIG. 14 depicts a block diagram of an embodiment of a computer system, in accordance with certain embodiments of the present disclosure.

Referring next to FIG. 14, an exemplary environment with which embodiments may be implemented is shown with a computer system 1400 that can be used by a designer 1404 to design, for example, electronic designs. The computer system 1400 can include a computer 1402, keyboard 1422, a network router 1412, a printer 1408, and a monitor 1406. The monitor 1406, processor 1402 and keyboard 1422 are part of a computer system 1426, which can be a laptop computer, desktop computer, handheld computer, mainframe computer, etc. The monitor 1406 can be a CRT, flat screen, etc.

A designer 1404 can input commands into the computer 1402 using various input devices, such as a mouse, keyboard 1422, track ball, touch screen, etc. If the computer system 1400 comprises a mainframe, a designer 1404 can access the computer 1402 using, for example, a terminal or terminal interface. Additionally, the computer system 1426 may be connected to a printer 1408 and a server 1410 using a network router 1412, which may connect to the Internet 1418 or a WAN.

The server 1410 may, for example, be used to store additional software programs and data. In some embodiments, software implementing the systems and methods described herein can be stored on a storage medium in the server 1410. Thus, the software can be run from the storage medium in the server 1410. In another embodiment, software implementing the systems and methods described herein can be stored on a storage medium in the computer 1402. Thus, the software can be run from the storage medium in the computer system 1426. Therefore, in this embodiment, the software can be used whether or not computer 1402 is connected to network router 1412. Printer 1408 may be connected directly to computer 1402, in which case, the computer system 1426 can print whether or not it is connected to network router 1412.

Figure 15:
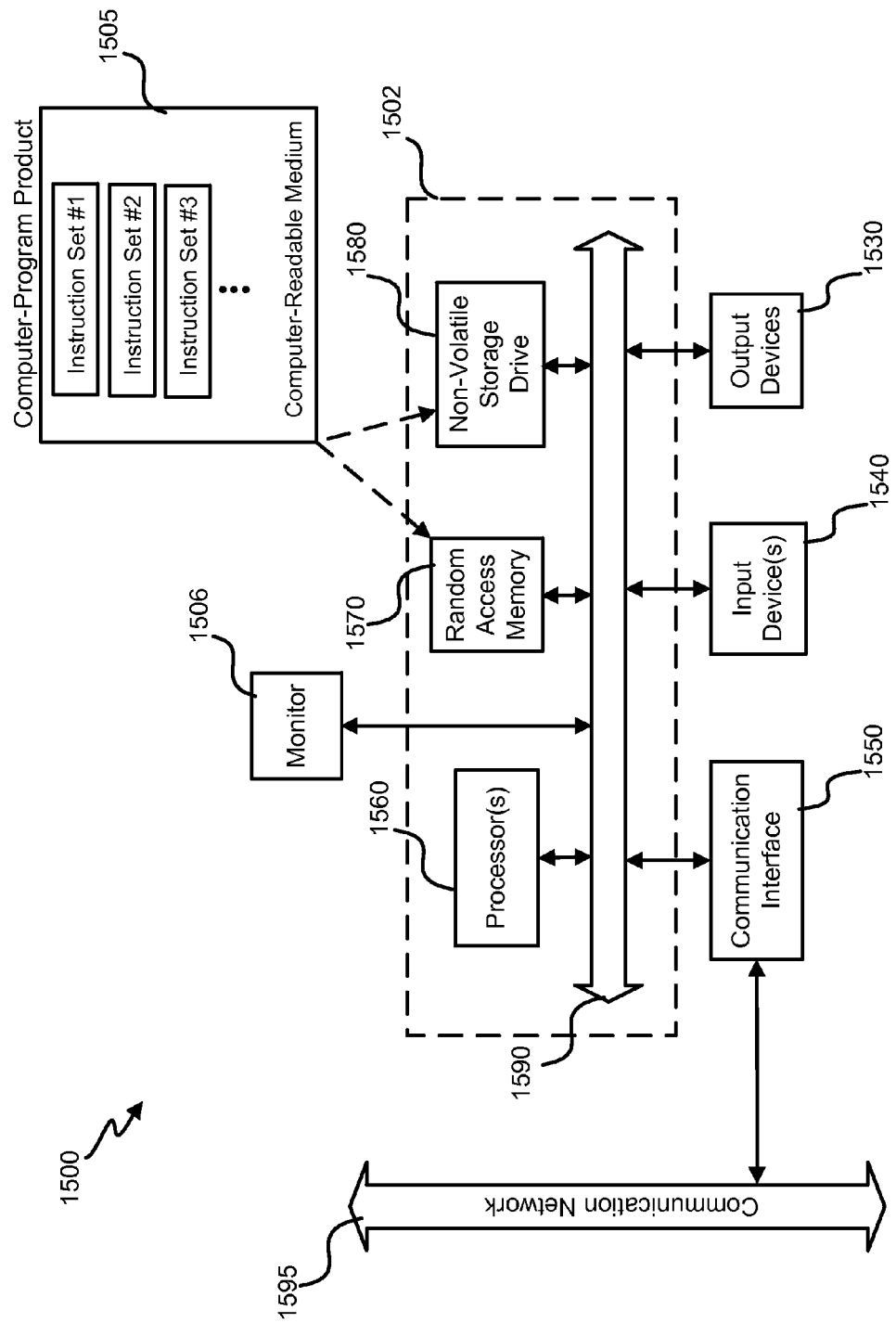
FIG. 15 depicts a block diagram of an embodiment of a special-purpose computer system, in accordance with certain embodiments of the present disclosure.

With reference to FIG. 15, an embodiment of a special-purpose computer system 1500 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1426, it is transformed into the special-purpose computer system 1500.

Special-purpose computer system 1500 comprises a computer 1502, a monitor 1406 coupled to computer 1502, one or more additional user output devices 1530 (optional) coupled to computer 1502, one or more user input devices 1540 (e.g., keyboard, mouse, track ball, touch screen) coupled to computer 1502, an optional communications interface 1550 coupled to computer 1502, a computer-program product 1505 stored in a tangible computer-readable memory in computer 1502. Computer-program product 1505 directs system 1500 to perform the above-described methods. Computer 1502 may include one or more processors 1560 that communicate with a number of peripheral devices via a bus subsystem 1590. These peripheral devices may include user output device(s) 1530, user input device(s) 1540, communications interface 1550, and a storage subsystem, such as random access memory (RAM) 1570 and non-volatile storage drive 1580 (e.g., disk drive, optical drive, solid state drive), which are forms of tangible computer-readable memory.

Computer-program product 1505 may be stored in non-volatile storage drive 1580 or another computer-readable medium accessible to computer 1502 and loaded into memory 1570. Each processor 1560 may comprise a microprocessor, such as a microprocessor from Intel® or Advanced Micro Devices, Inc.®, or the like. To support computer-program product 1505, the computer 1502 runs an operating system that handles the communications of product 1505 with the above-noted components, as well as the communications between the above-noted components in support of the computer-program product 1505. Exemplary operating systems include Windows® or the like from Microsoft® Corporation, Solaris® from Oracle®, LINUX, UNIX, and the like.

User input devices 1540 include all possible types of devices and mechanisms to input information to computer system 1502. These may include a keyboard, a keypad, a mouse, a scanner, a digital drawing pad, a touch screen incorporated into the display, audio input devices such as voice recognition systems, microphones, and other types of input devices. In various embodiments, user input devices 1540 are typically embodied as a computer mouse, a trackball, a track pad, a joystick, wireless remote, a drawing tablet, a voice command system. User input devices 1540 typically allow a user to select objects, icons, text and the like that appear on the monitor 1406 via a command such as a click of a button or the like. User output devices 1530 include all possible types of devices and mechanisms to output information from computer 1502. These may include a display (e.g., monitor 1406), printers, non-visual displays such as audio output devices, etc.

Communications interface 1550 provides an interface to other communication networks 1595 and devices and may serve as an interface to receive data from and transmit data to other systems, WANs and/or the Internet 1418. Embodiments of communications interface 1550 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1550 may be coupled to a computer network, to a FireWire® bus, or the like. In other embodiments, communications interface 1550 may be physically integrated on the motherboard of computer 1502, and/or may be a software program, or the like.

RAM 1570 and non-volatile storage drive 1580 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1570 and non-volatile storage drive 1580 may be configured to store the basic programming and data constructs that provide the functionality of various embodiments of the present invention, as described above.

Software instruction sets that provide the functionality of the present invention may be stored in RAM 1570 and non-volatile storage drive 1580. These instruction sets or code may be executed by the processor(s) 1560. RAM 1570 and non-volatile storage drive 1580 may also provide a repository to store data and data structures used in accordance with the present invention. RAM 1570 and non-volatile storage drive 1580 may include a number of memories including a main random access memory (RAM) to store of instructions and data during program execution and a read-only memory (ROM) in which fixed instructions are stored. RAM 1570 and non-volatile storage drive 1580 may include a file storage subsystem providing persistent (non-volatile) storage of program and/or data files. RAM 1570 and non-volatile storage drive 1580 may also include removable storage systems, such as removable flash memory.

Bus subsystem 1590 provides a mechanism to allow the various components and subsystems of computer 1502 communicate with each other as intended. Although bus subsystem 1590 is shown schematically as a single bus, alternative embodiments of the bus subsystem may utilize multiple busses or communication paths within the computer 1502.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system to facilitate provisioning of a plurality of platforms, the system comprising:
   one or more network interfaces configured to provide access to a network;
   one or more processors coupled to the one or more network interfaces to enable provisioning of a plurality of platforms, the one or more processors to execute instructions to:
      process first information enabling unique identification of a first provider, and determine a location of the first provider based on detected data of a location device, the first provider corresponding to a provider of one or more services and/or products in a determined geographic area of the detected location of the first provider;
      match the first provider to a first category from a set of categories, wherein the first provider matches one or more categories of the set of categories, the first category representing a first classification of a first set of providers sharing a first set of common attributes;
      identify a first set of platform features based at least in part on the first category, the first set of platform features corresponding to features that a platform application is adaptable to provide;
      determine a first set of service modules corresponding at least partially to the first set of platform features;
      generate a first definition of a first platform that is configured to interact with the first set of service modules to provide the first set of platform features;
      generate a first plan to provide access to the first platform with the first set of service modules based at least in part on the definition of the first platform;
      retain the definition and the plan in one or more repositories accessible by the one or more processors;
      configure a first platform application to provide the first platform based at least in part on the plan, the configuring comprising integrating the first set of service modules into the first platform application using one or more component interfaces;
      generate a graphical user interface for viewing and configured the first platform, the graphical user interface accessible via a display portal; and
      enable user access, via the network and the graphical user interface, to the first platform, the user access provided for the first provider; and
   one or more storage media coupled to the one or more processors to retain the instructions.

2. The system to facilitate provisioning of a plurality of platforms of claim 1, the one or more processors to further execute instructions to:
   expose, via the network, information about at least part of the first set of service features with corresponding user-selectable options; and
   process one or more indications of user selection of one or more service features of the first set of service features, the one or more indications of user selection received via the network;
   wherein the determining the set of service modules is based at least in part on the one or more indications of user selection of one or more service features of the set of service features.

3. The system to facilitate provisioning of a plurality of platforms of claim 1, the one or more processors to further execute instructions to:
   process second information enabling unique identification of a second provider;

match the second provider to a second category from the set of categories;
identify a second set of platform features based at least in part on the second category;
determine a second set of service modules corresponding at least partially to the second set of service features;
generate a second definition of a second platform that is configured to interact with the second set of service modules;
generate a plan to provide access to the first platform with the set of service modules based at least in part on the definition of the first platform;
configure a second platform application to provide the second platform based at least in part on the second plan; and
enable user access, via the network, to the second platform for the second provider.

4. The system to facilitate provisioning of a plurality of platforms of claim 1, the one or more processors to further execute instructions to:
allocate processing resources and/or database resources to the first platform application based at least in part on the plan.

5. The system to facilitate provisioning of a plurality of platforms of claim 1, the one or more processors to further execute instructions to:
process a first set of content related to the first provider, the first set of content relating to aspects of a business; and
prepare a first subset of content from the first set of content for presentation via the first platform application.

6. The system to facilitate provisioning of a plurality of platforms of claim 1, the one or more processors to further execute instructions to:
facilitate communication between the first provider and a consumer through the network based at least in part on the first platform.

7. The system to facilitate provisioning of a plurality of platforms of claim 1, wherein the first set of platform features is identified based at least in part on a platform template associated with the first category, the one or more processors to further execute instructions to:
identify a second set of platform features based at least in part on the first category, the second set of platform features corresponding to one or more potential customizations to the platform application; and
expose, via the network, information about at least part of the second set of service features with corresponding user-selectable options;
wherein the determining the first set of service modules is based at least in part on one or more indications of user selection of one or more service features of the second set of service features.

8. A method to facilitate provisioning of a plurality of platforms, the method comprising:
processing, by a computer system, first information enabling unique identification of a first provider, and determining a location of the first provider based on detected data of a location device, the first provider corresponding to a provider of one or more services and/or products in a determined geographic area of the detected location of the first provider;
matching, by the computer system, the first provider to a first category from a set of categories, wherein the first provider matches one or more categories of the set of categories, the first category representing a first classification of a first set of providers sharing a first set of common attributes;
identifying, by the computer system, a first set of platform features based at least in part on the first category, the first set of platform features corresponding to features that a platform application is adaptable to provide;
determining, by the computer system, a first set of service modules corresponding at least partially to the first set of platform features;
generating, by the computer system, a first definition of a first platform that is configured to interact with the first set of service modules to provide the first set of platform features;
generating, by the computer system, a first plan to provide access to the first platform with the first set of service modules based at least in part on the definition of the first platform;
retaining, by the computer system, the definition and the plan in one or more repositories accessible by the one or more processors;
configuring, by the computer system, a first platform application to provide the first platform based at least in part on the plan, the configuring comprising integrating the first set of service modules into the first platform application using one or more component interfaces;
generating, by the computer system, a graphical user interface for viewing and configured the first platform, the graphical user interface accessible via a display portal; and
enabling, by the computer system, user access, via the network and the graphical user interface, to the first platform, the user access provided for the first provider.

9. The method to facilitate provisioning of the plurality of platforms of claim 8, further comprising:
exposing, via the network, information about at least part of the first set of service features with corresponding user-selectable options; and
processing one or more indications of user selection of one or more service features of the first set of service features, the one or more indications of user selection received via the network;
wherein the determining the set of service modules is based at least in part on the one or more indications of user selection of one or more service features of the set of service features.

10. The method to facilitate provisioning of the plurality of platforms of claim 8, further comprising:
processing second information enabling unique identification of a second provider;
matching the second provider to a second category from the set of categories;
identifying a second set of platform features based at least in part on the second category;
determining a second set of service modules corresponding at least partially to the second set of service features;
generating a second definition of a second platform that is configured to interact with the second set of service modules;
generating a plan to provide access to the first platform with the set of service modules based at least in part on the definition of the first platform;
configuring a second platform application to provide the second platform based at least in part on the second plan; and
enable user access, via the network, to the second platform for the second provider.

11. The method to facilitate provisioning of the plurality of platforms of claim 8, further comprising:

allocating processing resources and/or database resources to the first platform application based at least in part on the plan.

12. The method to facilitate provisioning of the plurality of platforms of claim 8, further comprising:
   process a first set of content related to the first provider, the first set of content relating to aspects of a business; and
   prepare a first subset of content from the first set of content for presentation via the first platform application.

13. The method to facilitate provisioning of the plurality of platforms of claim 8, further comprising:
   facilitating communication between the first provider and a consumer through the network based at least in part on the first platform.

14. The method to facilitate provisioning of the plurality of platforms of claim 8, wherein the first set of platform features is identified based at least in part on a platform template associated with the first category further comprising:
   identify a second set of platform features based at least in part on the first category, the second set of platform features corresponding to one or more potential customizations to the platform application; and
   expose, via the network, information about at least part of the second set of service features with corresponding user-selectable options;
   wherein the determining the first set of service modules is based at least in part on one or more indications of user selection of one or more service features of the second set of service features.

15. One or more non-transitory, machine-readable media having machine-readable instructions thereon for facilitating provisioning of a plurality of platforms, which instructions, when executed by one or more computers or other processing devices, cause the one or more computers or other processing devices to:
   process first information enabling unique identification of a first provider, and determine a location of the first provider based on detected data of a location device, the first provider corresponding to a provider of one or more services and/or products in a determined geographic area of the detected location of the first provider;
   match the first provider to a first category from a set of categories, wherein the first provider matches one or more categories of the set of categories, the first category representing a first classification of a first set of providers sharing a first set of common attributes;
   identify a first set of platform features based at least in part on the first category, the first set of platform features corresponding to features that a platform application is adaptable to provide;
   determine a first set of service modules corresponding at least partially to the first set of platform features;
   generate a first definition of a first platform that is configured to interact with the first set of service modules to provide the first set of platform features;
   generate a first plan to provide access to the first platform with the first set of service modules based at least in part on the definition of the first platform;
   retain the definition and the plan in one or more repositories accessible by the one or more processors;
   configure a first platform application to provide the first platform based at least in part on the plan, the configuring comprising integrating the first set of service modules into the first platform application using one or more component interfaces;
   generate a graphical user interface for viewing and configuring the first platform, the graphical user interface accessible via a display portal; and
   enable user access, via the network and the graphical user interface, to the first platform, the user access provided for the first provider.

16. The one or more non-transitory, machine-readable media of claim 15, wherein the instructions, when executed by the one or more computers or other processing devices, cause the one or more computers or other processing devices to further:
   expose, via the network, information about at least part of the first set of service features with corresponding user-selectable options; and
   process one or more indications of user selection of one or more service features of the first set of service features, the one or more indications of user selection received via the network;
   wherein the determining the set of service modules is based at least in part on the one or more indications of user selection of one or more service features of the set of service features.

17. The one or more non-transitory, machine-readable media of claim 15, wherein the instructions, when executed by the one or more computers or other processing devices, cause the one or more computers or other processing devices to further:
   process second information enabling unique identification of a second provider;
   match the second provider to a second category from the set of categories;
   identify a second set of platform features based at least in part on the second category;
   determine a second set of service modules corresponding at least partially to the second set of service features;
   generate a second definition of a second platform that is configured to interact with the second set of service modules;
   generate a plan to provide access to the first platform with the set of service modules based at least in part on the definition of the first platform;
   configure a second platform application to provide the second platform based at least in part on the second plan; and
   enable user access, via the network, to the second platform for the second provider.

18. The one or more non-transitory, machine-readable media of claim 15, wherein the instructions, when executed by the one or more computers or other processing devices, cause the one or more computers or other processing devices to further:
   allocate processing resources and/or database resources to the first platform application based at least in part on the plan.

19. The one or more non-transitory, machine-readable media of claim 15, wherein the instructions, when executed by the one or more computers or other processing devices, cause the one or more computers or other processing devices to further:
   process a first set of content related to the first provider, the first set of content relating to aspects of a business; and
   prepare a first subset of content from the first set of content for presentation via the first platform application.

20. The one or more non-transitory, machine-readable media of claim 15, wherein the instructions, when executed by the one or more computers or other processing devices, cause the one or more computers or other processing devices to further: facilitate communication between the first provider and a consumer through the network based at least in part on the first platform.

* * * * *